United States Patent
Podgurny et al.

(10) Patent No.: US 9,141,922 B2
(45) Date of Patent: Sep. 22, 2015

(54) SYSTEM AND METHOD FOR PROVIDING A PRICE QUOTATION FOR A TRANSPORTATION SERVICE PROVIDING EQUIPMENT SELECTION CAPABILITY

(71) Applicant: CANADIAN NATIONAL RAILWAY COMPANY, Montreal (CA)

(72) Inventors: Leonard John Podgurny, Montreal (CA); Anita Ernesaks, Westmount (CA)

(73) Assignee: CANASIAN NATIONAL RAILWAY COMPANY, Montréal, Québec (CA)

(*) Notice: Subject to any disclaimer, the term of this patent is extended or adjusted under 35 U.S.C. 154(b) by 0 days.

(21) Appl. No.: 14/193,966

(22) Filed: Feb. 28, 2014

(65) Prior Publication Data

US 2014/0180955 A1   Jun. 26, 2014

Related U.S. Application Data

(63) Continuation of application No. 12/944,320, filed on Nov. 11, 2010, now Pat. No. 8,700,500, which is a continuation of application No. 12/385,661, filed on Apr. 15, 2009, now abandoned, which is a continuation of application No. 10/060,402, filed on Feb. 1, 2002, now Pat. No. 7,539,650.

(51) Int. Cl.
*G06Q 10/00* (2012.01)
*G06Q 20/00* (2012.01)
(Continued)

(52) U.S. Cl.
CPC ............. *G06Q 10/06* (2013.01); *G06Q 10/08* (2013.01); *G06Q 10/083* (2013.01);
(Continued)

(58) Field of Classification Search
CPC ... G06Q 20/203; G06Q 10/087; G06Q 10/08; G06Q 10/0875; G06Q 10/06; G06Q 20/201; G06Q 30/06; G06Q 20/20; G06Q 20/202; G06Q 40/10; G07G 1/145
USPC .......................................... 705/28, 20, 22, 29
See application file for complete search history.

(56) References Cited

U.S. PATENT DOCUMENTS 3,705,410 A * 12/1972 Kooy et al. .................. 705/7.12
4,992,940 A    2/1991 Dworkin
(Continued)

FOREIGN PATENT DOCUMENTS

CA    2369836    8/2003
CA    2370053    8/2003
(Continued)

OTHER PUBLICATIONS

Burlington Northern Santa Fe 2000 report, :http:/www.bnsf.com, Jan. 23, 2001, 10 pages.*

(Continued)

*Primary Examiner* — Matthew Gart
*Assistant Examiner* — Harshad Parikh

(57) ABSTRACT

A method and system for computing the price for shipping goods. The method includes causing a computer to deliver first information to a user prompting the user to enter at the computer information about a rail transportation service for shipment of goods by one or more railcars. Information about a basic pool of railcars is received and filtered based on one or more filtering criteria to produce a filtered pool of railcars. The computer is then caused to deliver second information to the user prompting the user to select at the computer one or more railcars among the filtered pool of railcars for the shipment of goods. A price for the shipment of the goods is then computed at least in part on the basis of the rail transportation service and the one or more characteristics of the railcars in the filtered pool of railcars selected by the user.

12 Claims, 11 Drawing Sheets

(51) Int. Cl.

| | | |
|---|---|---|
| *A01K 5/02* | (2006.01) | |
| *G06F 17/50* | (2006.01) | |
| *G06Q 10/06* | (2012.01) | |
| *G06Q 10/08* | (2012.01) | |
| *G06Q 30/02* | (2012.01) | |
| *G06Q 30/06* | (2012.01) | |
| *G06Q 20/20* | (2012.01) | |
| *G06Q 30/04* | (2012.01) | |
| *G06Q 40/00* | (2012.01) | |
| *G07G 1/14* | (2006.01) | |

(52) U.S. Cl.
CPC ......... *G06Q 10/087* (2013.01); *G06Q 10/0875* (2013.01); *G06Q 20/20* (2013.01); *G06Q 20/201* (2013.01); *G06Q 20/202* (2013.01); *G06Q 20/203* (2013.01); *G06Q 30/0283* (2013.01); *G06Q 30/04* (2013.01); *G06Q 30/06* (2013.01); *G06Q 30/0601* (2013.01); *G06Q 40/10* (2013.01); *G07G 1/145* (2013.01); *H05K 999/00* (2013.01)

(56) References Cited

U.S. PATENT DOCUMENTS

| | | | | |
|---|---|---|---|---|
| 5,008,661 | A | * | 4/1991 | Raj ............................ 340/10.51 |
| 5,088,586 | A | * | 2/1992 | Isobe et al. ................... 194/205 |
| 5,204,821 | A | * | 4/1993 | Inui et al. .................... 700/106 |
| 5,337,246 | A | | 8/1994 | Carroll et al. |
| 5,541,848 | A | | 7/1996 | McCormack et al. |
| 5,631,827 | A | * | 5/1997 | Nicholls et al. ................. 705/28 |
| 5,712,789 | A | * | 1/1998 | Radican ....................... 700/226 |
| 5,715,398 | A | | 2/1998 | Lubenow et al. |
| 5,732,401 | A | * | 3/1998 | Conway .......................... 705/29 |
| 5,758,329 | A | * | 5/1998 | Wojcik et al. ................... 705/28 |
| 5,768,578 | A | | 6/1998 | Kirk et al. |
| 5,781,892 | A | * | 7/1998 | Hunt et al. ........................ 705/5 |
| 5,797,132 | A | * | 8/1998 | Altwasser ....................... 705/16 |
| 5,809,479 | A | * | 9/1998 | Martin et al. ................. 705/7.24 |
| 5,819,943 | A | * | 10/1998 | Depuy .......................... 206/522 |
| 5,835,716 | A | | 11/1998 | Hunt et al. |
| 5,870,711 | A | * | 2/1999 | Huffman ..................... 705/7.13 |
| 5,870,719 | A | | 2/1999 | Maritzen et al. |
| 5,873,069 | A | * | 2/1999 | Reuhl et al. ...................... 705/20 |
| 5,884,300 | A | * | 3/1999 | Brockman ............................ 1/1 |
| 5,893,093 | A | * | 4/1999 | Wills .................................. 1/1 |
| 5,895,454 | A | | 4/1999 | Harrington |
| 5,910,896 | A | * | 6/1999 | Hahn-Carlson ............... 700/231 |
| 5,926,118 | A | | 7/1999 | Hayashida et al. |
| 5,926,817 | A | | 7/1999 | Christeson et al. |
| 5,946,662 | A | * | 8/1999 | Ettl et al. ...................... 705/7.26 |
| 5,948,040 | A | | 9/1999 | DeLorme et al. |
| 5,960,408 | A | * | 9/1999 | Martin et al. ................. 705/7.25 |
| 5,978,776 | A | * | 11/1999 | Seretti et al. ................. 705/27.1 |
| 5,999,914 | A | | 12/1999 | Blinn et al. |
| 6,026,378 | A | * | 2/2000 | Onozaki ........................... 705/28 |
| 6,029,150 | A | | 2/2000 | Kravitz |
| 6,035,289 | A | * | 3/2000 | Chou et al. ................... 705/36 R |
| 6,052,667 | A | * | 4/2000 | Walker et al. ................... 705/15 |
| 6,055,519 | A | | 4/2000 | Kennedy et al. |
| 6,061,667 | A | * | 5/2000 | Danford-Klein et al. ..... 705/400 |
| 6,064,981 | A | | 5/2000 | Barni et al. |
| 6,076,080 | A | | 6/2000 | Morscheck et al. |
| 6,078,889 | A | * | 6/2000 | Boucher et al. .............. 705/7.29 |
| 6,078,897 | A | | 6/2000 | Rubin et al. |
| 6,078,900 | A | * | 6/2000 | Ettl et al. .......................... 705/28 |
| 6,085,172 | A | * | 7/2000 | Junger ............................. 705/28 |
| 6,115,690 | A | | 9/2000 | Wong |
| 6,119,094 | A | | 9/2000 | Lynch et al. |
| 6,138,105 | A | * | 10/2000 | Walker et al. ............... 705/14.41 |
| 6,141,653 | A | | 10/2000 | Conklin et al. |
| 6,141,658 | A | | 10/2000 | Mehr et al. |
| 6,148,291 | A | * | 11/2000 | Radican ........................... 705/28 |
| 6,151,582 | A | | 11/2000 | Huang et al. |
| 6,163,799 | A | | 12/2000 | Kambayashi et al. |
| 6,167,380 | A | * | 12/2000 | Kennedy et al. .............. 705/7.31 |
| 6,168,076 | B1 | | 1/2001 | Yamamoto et al. |
| 6,219,653 | B1 | * | 4/2001 | O'Neill et al. ................. 705/400 |
| 6,292,784 | B1 | * | 9/2001 | Martin et al. ................. 705/7.21 |
| 6,304,856 | B1 | * | 10/2001 | Soga et al. ....................... 705/28 |
| 6,305,148 | B1 | * | 10/2001 | Bowden et al. ................. 53/432 |
| 6,321,657 | B1 | | 11/2001 | Owen |
| 6,430,467 | B1 | * | 8/2002 | D'Amelio et al. ............ 700/213 |
| 6,459,986 | B1 | | 10/2002 | Boyce et al. |
| 6,463,419 | B1 | | 10/2002 | Kluss |
| 6,511,023 | B2 | * | 1/2003 | Harland .................... 246/122 R |
| 6,516,266 | B2 | | 2/2003 | Shoji |
| 6,526,392 | B1 | * | 2/2003 | Dietrich et al. ............... 705/400 |
| 6,553,350 | B2 | | 4/2003 | Carter |
| 6,625,584 | B1 | * | 9/2003 | Bains et al. ................... 705/400 |
| 6,697,702 | B1 | | 2/2004 | Hahn-Carlson |
| 6,704,612 | B1 | | 3/2004 | Hahn-Carlson |
| 6,785,661 | B1 | * | 8/2004 | Dixon et al. ..................... 705/39 |
| 6,871,137 | B2 | * | 3/2005 | Scaer et al. .................... 701/517 |
| 6,915,268 | B2 | | 7/2005 | Riggs et al. |
| 6,920,429 | B1 | | 7/2005 | Barni et al. |
| 6,937,992 | B1 | | 8/2005 | Benda et al. |
| 6,945,288 | B1 | * | 9/2005 | Brakefield et al. ............. 141/231 |
| 6,970,855 | B2 | | 11/2005 | Das et al. |
| 6,990,473 | B1 | | 1/2006 | Yabuki |
| 7,035,856 | B1 | | 4/2006 | Morimoto |
| 7,080,034 | B1 | * | 7/2006 | Reams ............................. 705/37 |
| 7,139,793 | B2 | | 11/2006 | Lala et al. |
| 7,219,067 | B1 | | 5/2007 | McMullen et al. |
| 7,539,650 | B2 | * | 5/2009 | Podgurny et al. ............. 705/400 |
| 7,680,674 | B2 | | 3/2010 | Podgurny et al. |
| 7,711,629 | B2 | * | 5/2010 | Laurent et al. ................... 705/37 |
| 7,894,937 | B2 | * | 2/2011 | Tedesco et al. ................ 700/238 |
| 7,895,092 | B2 | * | 2/2011 | Amling et al. ................... 705/28 |
| 8,050,976 | B2 | * | 11/2011 | Staib et al. .................... 705/26.1 |
| 8,321,317 | B2 | * | 11/2012 | Hansen ............................ 705/35 |
| 8,442,888 | B2 | * | 5/2013 | Hansen ............................ 705/35 |
| 2001/0011232 | A1 | * | 8/2001 | Peterson et al. ................. 705/26 |
| 2001/0014868 | A1 | | 8/2001 | Herz et al. |
| 2001/0016821 | A1 | * | 8/2001 | DeBusk et al. ..................... 705/2 |
| 2001/0027418 | A1 | * | 10/2001 | Johnson ............................ 705/22 |
| 2001/0032128 | A1 | | 10/2001 | Kepecs |
| 2001/0034625 | A1 | * | 10/2001 | Kwoh ................................ 705/6 |
| 2001/0037281 | A1 | * | 11/2001 | French et al. .................... 705/37 |
| 2001/0044751 | A1 | | 11/2001 | Pugliese, III et al. |
| 2001/0047284 | A1 | * | 11/2001 | Blalock et al. ..................... 705/8 |
| 2001/0047303 | A1 | * | 11/2001 | Greenstone ..................... 705/22 |
| 2001/0049629 | A1 | * | 12/2001 | Freeman ......................... 705/23 |
| 2001/0049653 | A1 | * | 12/2001 | Sheets ............................. 705/38 |
| 2001/0051849 | A1 | * | 12/2001 | Boone ............................ 701/201 |
| 2001/0053981 | A1 | * | 12/2001 | Wyssen ............................. 705/1 |
| 2001/0056376 | A1 | * | 12/2001 | Walker et al. ................... 705/15 |
| 2002/0007340 | A1 | * | 1/2002 | Isaf et al. ......................... 705/37 |
| 2002/0013718 | A1 | * | 1/2002 | Cornwell ........................... 705/5 |
| 2002/0019759 | A1 | | 2/2002 | Arunapuram et al. |
| 2002/0026373 | A1 | | 2/2002 | Kamath et al. |
| 2002/0032573 | A1 | | 3/2002 | Williams et al. |
| 2002/0032610 | A1 | | 3/2002 | Gold et al. |
| 2002/0046130 | A1 | | 4/2002 | Monteleone et al. |
| 2002/0049622 | A1 | | 4/2002 | Lettich et al. |
| 2002/0087371 | A1 | | 7/2002 | Abendroth |
| 2002/0103653 | A1 | | 8/2002 | Huxter |
| 2002/0116318 | A1 | | 8/2002 | Thomas et al. |
| 2002/0184042 | A1 | | 12/2002 | Hommrich et al. |
| 2003/0018513 | A1 | | 1/2003 | Hoffman et al. |
| 2003/0018528 | A1 | | 1/2003 | Sakatsume et al. |
| 2003/0023567 | A1 | | 1/2003 | Berkovitz et al. |
| 2003/0037041 | A1 | | 2/2003 | Hertz |
| 2003/0040944 | A1 | | 2/2003 | Hileman |
| 2003/0063111 | A1 | | 4/2003 | Maclean et al. |
| 2003/0069845 | A1 | | 4/2003 | DeWitt et al. |
| 2003/0135304 | A1 | | 7/2003 | Sroub et al. |
| 2003/0163330 | A1 | | 8/2003 | Podgurny et al. |
| 2003/0163331 | A1 | | 8/2003 | Podgurny et al. |
| 2003/0163332 | A1 | * | 8/2003 | Podgurny et al. .................. 705/1 |
| 2003/0163333 | A1 | | 8/2003 | Podgurny et al. |
| 2003/0163378 | A1 | * | 8/2003 | Podgurny et al. ................ 705/26 |
| 2003/0171940 | A1 | | 9/2003 | Podgurny et al. |

(56) References Cited

U.S. PATENT DOCUMENTS

| | | | |
|---|---|---|---|
| 2003/0182052 A1 | 9/2003 | DeLorme et al. | |
| 2003/0191724 A1* | 10/2003 | Turra et al. | 705/400 |
| 2003/0216992 A1* | 11/2003 | Say | 705/37 |
| 2003/0225630 A1 | 12/2003 | Kakuta | |
| 2004/0002925 A1 | 1/2004 | Gordon | |
| 2004/0054549 A1 | 3/2004 | Chittenden et al. | |
| 2004/0083120 A1* | 4/2004 | Sandoval | 705/1 |
| 2004/0093313 A1 | 5/2004 | Bains et al. | |
| 2004/0177008 A1 | 9/2004 | Yang | |
| 2004/0213652 A1* | 10/2004 | Campbell et al. | 414/398 |
| 2004/0249699 A1* | 12/2004 | Laurent et al. | 705/10 |
| 2004/0254807 A1* | 12/2004 | Laurent et al. | 705/1 |
| 2005/0021346 A1* | 1/2005 | Nadan et al. | 705/1 |
| 2005/0149373 A1* | 7/2005 | Amling et al. | 705/8 |
| 2005/0149453 A1* | 7/2005 | Amling et al. | 705/60 |
| 2005/0171852 A1* | 8/2005 | Mabrito | 705/20 |
| 2005/0261986 A1 | 11/2005 | Haynes et al. | |
| 2006/0074791 A1* | 4/2006 | Jelaco | 705/37 |
| 2006/0080133 A1 | 4/2006 | Das et al. | |
| 2006/0085285 A1 | 4/2006 | Cichanowicz | |
| 2007/0011052 A1* | 1/2007 | Liu et al. | 705/20 |
| 2007/0073551 A1 | 3/2007 | Williams et al. | |
| 2007/0299747 A1* | 12/2007 | Shorter et al. | 705/28 |
| 2007/0299790 A1* | 12/2007 | Berkovitz et al. | 705/400 |
| 2008/0059329 A1 | 3/2008 | Luchene et al. | |
| 2008/0275791 A1* | 11/2008 | Youssef et al. | 705/26 |
| 2009/0012902 A1* | 1/2009 | Alderucci et al. | 705/80 |
| 2009/0314384 A1* | 12/2009 | Brakefield et al. | 141/67 |
| 2010/0088208 A1* | 4/2010 | Saxena et al. | 705/34 |
| 2010/0172726 A1* | 7/2010 | Russ et al. | 414/343 |
| 2010/0257114 A1* | 10/2010 | Amling et al. | 705/331 |
| 2011/0022534 A1* | 1/2011 | Amling et al. | 705/333 |
| 2011/0060696 A1* | 3/2011 | Podgurny et al. | 705/330 |
| 2012/0111448 A1* | 5/2012 | Brakefield et al. | 141/67 |
| 2013/0204725 A1* | 8/2013 | Damon | 705/20 |
| 2013/0268379 A1* | 10/2013 | Anderson et al. | 705/20 |
| 2013/0332271 A1* | 12/2013 | Ronny | 705/14.51 |
| 2015/0019357 A1* | 1/2015 | Evfimiou et al. | 705/22 |

FOREIGN PATENT DOCUMENTS

| | | |
|---|---|---|
| CA | 2370061 | 8/2003 |
| CA | 2370065 | 8/2003 |
| CA | 2370068 | 8/2003 |
| CA | 2370084 | 8/2003 |
| WO | 02/03221 | 1/2002 |

OTHER PUBLICATIONS

Burlington Northern Santa Fe 2000 report,:http/www.bnsf.com, Jan. 23, 2001, 10 pages.*

I2 Expands Tradematrix Solution, PR News Wire, New York, Feb. 29, 2000 p. 1.*

GATX—A Specialized Leasing Company, http://www.gatx.com/index.asp, Copyright 2007 GATX Corporation, Feb. 2000, 1 page.

Railway Age—Moving goods, not paperwork, Copyright 2000 Simmons-Boardman Publishing Corp., http://www.railwayage.com/nov00/moving_goods.html, Nov. 2000, 5 pages.

i2 Expands TradeMatrix (TM) Solution with FreightMatrix (TM)—Electronic Marketplace for Logistics Industry, Feb. 29, 2000, PR Newswire, 3 pages.

Logility Reaches Agreement with INSIGHT to Enhance Supply Chain OPTIMIZATION Capabilities, Apr. 30, 1998, PR Newswire, 2 pages.

SAP and Federal Express Launch Integrated Solution to Extend Global Supply-Chain Capabilities to R/3 Users, Apr. 8, 1998, Business Wire, 2 pages.

Quinn, Francis J., The power of integration, Aug. 1, 1998, 2 pages.

Canadian Pacific Railway, http://www.cpr.ca/Internet/CPRPortal.asp, Jan. 23, 2001, 6 pages.

Burlington Northern Santa Fe, http://www.bnsf.com, Jan. 23, 2001, 10 pages.

Norfolk Southern Corporation, http://www.nscorp.com/nscorp/html/home.html, Jan. 23, 2001, 2 pages.

CSX Transportation, www.csxt.com/eco/index.htm, Jan. 23, 2001, 8 pages.

Kansas City Southern Industries, http://www.ksci.com, Jan. 23, 2001, 2 pages.

Wisconsin Central System E-Commerce, http://www.wclx.com/apps.shtml, Jan. 23, 2001, 2 pages.

Luczak, Marybeth, "Moving Goods Not Paperwork", Nov. 2000, Railway Age, V. 20 N. 11, pp. 35-37.

Office Action mailed on Aug. 22, 2003 in connection with U.S. Appl. No. 10/060,402, 5 pages.

Office Action mailed on Jul. 27, 2004 in connection with U.S. Appl. No. 10/060,402, 6 pages.

Office Action mailed on Jan. 22, 2004 in connection with U.S. Appl. No. 10/060,402, 5 pages.

Office Action mailed on Jan. 11, 2005 in connection with U.S. Appl. No. 10/060,402, 5 pages.

Office Action mailed on Apr. 1, 2005 in connection with U.S. Appl. No. 10/060,402, 5 pages.

Office Action mailed on Aug. 11, 2006 in connection with U.S. Appl. No. 10/060,402, 6 pages.

Office Action mailed on Jun. 8, 2007 in connection with U.S. Appl. No. 10/060,402, 6 pages.

Office Action mailed on Jul. 30, 2009 in connection with U.S. Appl. No. 12/385,661, 28 pages.

Office Action mailed on Jan. 30, 2006 in connection with U.S. Appl. No. 10/060,405, 13 pages.

Office Action mailed on Sep. 8, 2006 in connection with U.S. Appl. No. 10/060,405, 11 pages.

Office Action mailed on Feb. 9, 2007 in connection with U.S. Appl. No. 10/060,405, 12 pages.

Office Action mailed on Oct. 16, 2007 in connection with U.S. Appl. No. 10/060,405, 22 pages.

Office Action mailed on May 29, 2008 in connection with U.S. Appl. No. 10/060,405, 9 pages.

Office Action mailed on Dec. 4, 2008 in connection with U.S. Appl. No. 10/060,405, 9 pages.

Appeal Brief filed on Jul. 24, 2009 in connection with U.S. Appl. No. 10/060,405, 48 pages.

Examiner reply to Appeal Brief mailed on Sep. 1, 2009 in connection with U.S. Appl. No. 10/060,405, 11 pages.

Office Action mailed on Jan. 4, 2006 in connection with U.S. Appl. No. 10/060,403, 13 pages.

Office Action mailed on Aug. 11, 2006 in connection with U.S. Appl. No. 10/060,403, 12 pages.

Office Action mailed on Apr. 20, 2007 in connection with U.S. Appl. No. 10/060,403, 23 pages.

Notice of Allowance mailed on Dec. 5, 2007 in connection with U.S. Appl. No. 10/060,403, 17 pages.

Office Action mailed on Sep. 11, 2009 in connection with U.S. Appl. No. 12/073,443, 17 pages.

Office Action mailed on Jan. 30, 2006 in connection with U.S. Appl. No. 10/060,406, 15 pages.

Office Action mailed on Aug. 15, 2006 in connection with U.S. Appl. No. 10/060,406,15 pages.

Office Action mailed on May 1, 2007 in connection with U.S. Appl. No. 10/060,406, 24 pages.

Notice of Allowance mailed on Nov. 20, 2007 in connection with U.S. Appl. No. 10/060,406, 14 pages.

Notice of Allowance mailed on Apr. 1, 2008 in connection with U.S. Appl. No. 10/060,406, 15 pages.

Office Action mailed on Jan. 30, 2006 in connection with U.S. Appl. No. 10/060,407, 24 pages.

Office Action mailed on Aug. 11, 2006 in connection with U.S. Appl. No. 10/060,407, 22 pages.

Notice of Allowance mailed on Mar. 9, 2007 in connection with U.S. Appl. No. 10/060,407, 10 pages.

Office Action mailed on Sep. 11, 2009 in connection with U.S. Appl. No. 12/073,663, 11 pages.

Office Action mailed on Feb. 4, 2008 in connection with U.S. Appl. No. 10/355,210, 11 pages.

(56) References Cited

OTHER PUBLICATIONS

Office Action mailed on Oct. 9, 2008 in connection with U.S. Appl. No. 10/355,210, 14 pages.
Office Action mailed on Mar. 4, 2009 in connection with U.S. Appl. No. 10/355,210, 16 pages.
Notice of Allowance mailed on Nov. 6, 2009 in connection with U.S. Appl. No. 10/355,210, 14 pages.
Office Action mailed on May 11, 2010 in connection with U.S. Appl. No. 12/385,661, 53 pages.
Office Action mailed on May 17, 2010 in connection with U.S. Appl. No. 12/073,663, 12 pages.
The CSX website, "www.csx.com" dating to Mar. 2000, 3 pages.
"Working Inside the box", Modern Materials Handling, Apr. 2001, V. 56, No. 4, p. 3.
"Former Circle CEO beatson heading logistics dot-com", Aug. 7, 2000, Journal of Commerce, 3 pages.
"Chain store age executive with shopping center age", Logility, Aug. 1999, V. 78, No. 8, p. 78.
"Logility Moves Forward with Enhancements to Transportation Planning and Management", PR Newswire, Jun. 17, 1999, p. 1005.
"Moving the Mostest the Fastest", Nov. 1995, International Business, p. 28.
Conley, John, "Moving the Mostest the Fastest", Nov. 1995, International Business, p. 28-32.
Kaufman, Lawrence H., "E-Business is Good Business", Mar. 2000, Railway Age, vol. 201, Iss. 3, pp. 38-39.
"1997 Railcar Review and Analysis", Dec. 1996, vol. 197, No. 12, Railway Age, pp. DB9-DB11.
"USF Holland Meets Stringent quality Standard; Receives TTX Award for Products and Services", Jul. 16, 2002, Business Wire, pp. 1-2.
Minahan, Tim, "Intermodal demand is rising but can the industry keep up?", Dec. 11, 1997, Purchasing, V 123, n. 9, pp. 75-76.
Gallagher, John, "Barge Right in", Aug. 20, 2001, Traffic World, V. 265, N. 34, pp. 24.
CSX Intermodal Unveils Customer-Focussed Website, http://www.csix.com, 2 pages.
Decision from the Board of Patent Appeals and Interferences (BPAI) mailed on Mar. 12, 2012, in connection with U.S. Appl. No. 10/060,405, 10 pages.
Office Action mailed on Jun. 12, 2012, in connection with U.S. Appl. No. 12/944,320, 32 pages.
Office Action mailed on Nov. 26, 2012, in connection with U.S. Appl. No. 10/060,405, 11 pages.
Office Action mailed on Sep. 23, 2013, in connection with U.S. Appl. No. 12/944,320, 59 pages.
Examiner Report issued on Feb. 10, 2012, in connection with Canadian Patent CA 2,370,068, 4 pages.
Examiner Report issued on Feb. 15, 2012, in connection with Canadian Patent CA 2,370,065, 6 pages.
Examiner Report issued on Feb. 24, 2012, in connection with Canadian Patent CA 2,418,528, 5 pages.
Examiner Report issued on Apr. 5, 2012, in connection with Canadian Patent CA 2,370,053, 7 pages.
Examiner Report issued on Feb. 20, 2014, in connection with Canadian Patent CA 2,370,053, 2 pages.
Examiner Report issued on Aug. 27, 2013, in connection with Canadian Patent CA 2,370,065, 5 pages.
Examiner Report issued on Apr. 13, 2012, in connection with Canadian Patent CA 2,369,836, 7 pages.
Examiner Report issued on Apr. 11, 2012, in connection with Canadian Patent CA 2,370,084, 3 pages.
Examiner Report issued on Jul. 19, 2012, in connection with Canadian Patent CA 2,370,061, 3 pages.
Examiner Report issued on Feb. 11, 2014, in connection with Canadian Patent CA 2,370,084, 2 pages.
Examiner Report issued on Feb. 12, 2014, in connection with Canadian Patent CA 2,369,836, 2 pages.
Examiner Report issued on Mar. 21, 2014, in connection with Canadian Patent CA 2,418,258, 3 pages.
Examiner Report issued on Apr. 3, 2014, in connection with Canadian Patent CA 2,370,061, 3 pages.
Final Office Action mailed on Feb. 27, 2013, in connection with U.S. Appl. No. 12/944,320, 32 pages.
Examiner's report issued on Feb. 24, 2015 in connection with Canadian Patent Application 2,370,053, 6 pages.
Examiner's report issued on Feb. 26, 2015 in connection with Canadian Patent Application 2,369,836, 6 pages.
Examiner's report issued on Dec. 22, 2014 in connection with Canadian Patent Application 2,370,084, 4 pages.

* cited by examiner

SYSTEM AND METHOD FOR PROVIDING A PRICE QUOTATION FOR A TRANSPORTATION SERVICE PROVIDING EQUIPMENT SELECTION CAPABILITY

FIELD OF THE INVENTION

The present invention relates to a system and method for facilitating on-line commerce over a computer network such as the Internet. More specifically, the present invention relates to a system for enabling a customer to obtain, over a computer network, a price quotation for a railway transportation service.

BACKGROUND OF THE INVENTION

Traditionally, price quotations for standard goods and services have been given via catalogue, telephone, facsimile and more recently electronically via web pages on global computer networks such as the Internet. Internet service providers are, more and more, connecting users to the Internet at no cost to the users, thereby making the Internet more accessible to a wide range of users. Many of the users connected to the Internet, or having access to other forms of computer networks are choosing to conduct activities relating to commerce over these networks. At the same time, merchants are increasingly developing sites on the World Wide Web (or simply "www" or "web") that customers can access in order to purchase goods and/or services. It is now fairly common for a customer to browse a merchant's catalogue, select a product or service and place an order for the product or service all electronically over the Internet.

For example, U.S. Pat. No. 6,115,690, issued on Sep. 5, 2000 to Wong, describes a software system for providing integrated business-to-business Web commerce and business automation. The end-to-end Web business is facilitated by using a computing model based on a single integrated database management system. The software provides a graphical user interface that allows a user to obtain a quote for a product based on a merchant's product list. The quote is assigned a quote number and saved in a database management system, and may be retrieved and viewed at a later date by the customer. Customers and vendors can view payment status, previous quotes and product tracking information. The contents of the above documents are hereby incorporated by reference.

In another example, U.S. Pat. No. 5,926,817, issued on Jul. 20, 1999 to Christeson et al., describes a Graphical User Interface (GUI) that allows a user to select optional features relating to a product or service, and then provides the user with immediate feedback in the form of product availability and price quotations. The GUI allows the user to select a product/service, as well as to select and unselect a set of optional features to customize a desired product/service. The system, on the basis of the information provided by the user generates a quote for that product/service and the quote is displayed on the GUI. This system is directed for use by communication service companies for providing dynamic price quoting to their clients when the latter select particular service features. The contents of the above documents are hereby incorporated by reference.

In the above-described documents, the user is provided with predefined goods and services from which the user makes a selection. Such a method generally provides little choice in terms of the definition of the service to be provided and, as such, these systems are generally ill-suited for providing price quotations in the field of transportation services.

In the field of transportation services, systems providing price quotations based on origin, destination and commodity types have also been developed. U.S. Pat. No. 6,061,667, issued on May 9, 2000 to Danford-Klein et al., describes a rating engine for processing rating requests associated with a carrier contract. The system provides a base rating engine for use on a computer that is operable to calculate line rates in response to a rating request by a client application. A rating server application performs the necessary calculations regarding a rating request and returns the results of the request to a client application. The contents of the above documents are hereby incorporated by reference.

A deficiency of the systems of the type described in Danford-Klein et al. is that they provide limited flexibility in the price quotation process for a transportation service. The price quotations are typically generic quotations given to all customers. In order for a customer to obtain a more customized price quotation, the customer must generally contact an account manager in the traditional manner via telephone, mail, e-mail or other means. This type of interaction is costly from both the customer's end and from the transportation service provider's end since valuable resources in terms of man-hours must be dedicated to these telephone, mail, e-mail and other contacts.

Consequently there exists a need in the industry to provide an improved system and method for providing a price quotation for a railway transportation service that alleviates at least in part the deficiencies of prior art systems and methods.

SUMMARY OF THE INVENTION

In accordance with a broad aspect, the invention provides a method for computing the price for shipping goods. The method includes causing a computer to deliver first information to a user prompting the user to enter at the computer information about a rail transportation service for shipment of goods by one or more railcars. Information about a basic pool of railcars is received and filtered based on one or more filtering criteria to produce a filtered pool of railcars. The computer is then caused to deliver second information to the user prompting the user to select at the computer one or more railcars among the filtered pool of railcars for the shipment of goods. A price for the shipment of the goods is then computed at least in part on the basis of the rail transportation service and the one or more characteristics of the railcars in the filtered pool of railcars selected by the user.

Advantageously, the invention allows increased flexibility in the computation of the price for the rail transportation service for shipment of goods since it allows the user at the customer's side to customize the service request without requiring human interaction from the transportation service provider.

Another advantage of the present invention is that it provides the user with a more relevant list of equipment based on the selected filtering criteria and thereby facilitates the selection of suitable equipment.

In a specific implementation, the delivering of the first information to the user is done by displaying information on a screen and the user provides the information about the rail transportation service through an input device such as a keyboard, pointing device, touch sensitive surface and speech recognition unit or any other suitable input device. The information about the rail transportation service includes information specifying an origin of the shipment, a destination of the shipment, a commodity being transported and any other suitable information. In a non-limiting implementation, the first information includes a series of routes among which the user can select at least one route.

Optionally, the computer is caused to display to the user on the screen the price for the shipment of the goods. Alternatively, an e-mail containing information indicative of the computed price for the shipment of the goods is generated and transmitted to the user. Alternative embodiments include transmitting the price for the shipment of the goods to the user via snail-mail and facsimile or by any other suitable communication device.

In the specific example, the computer delivers second information to the user to prompt the user to enter at the computer the one or more filtering criteria for use by the filtering. Alternatively, the one or more of the filtering criteria are extracted from a user profile file. The filtering criteria include information about ownership of the rail cars to be used for the shipment of the goods (such as the party that owns the railcars), information about the type of goods to be shipped, the type of rail car to use for the shipment of the goods.

In accordance with another broad aspect, the invention provides an apparatus for implementing the above-described method.

In accordance with yet another broad aspect, the invention provides a computer readable medium including a program element suitable for execution by a CPU for computing the price for a railway transportation service for the shipping goods in accordance with the above described method.

In accordance with another broad aspect, the invention provides a server system including a computer readable medium including a program element suitable for execution by a CPU for computing the price for a railway transportation service for the shipping goods in accordance with the above described method.

In accordance with another broad aspect, the invention provides a method for requesting a quote for a price for shipping goods by rail. The method includes displaying information at a client system prompting a user to enter at the client system information about a rail transportation service for shipment of goods by one or more railcars. Information is also displayed at the client system prompting the user to enter at the client system one or more filtering criteria. The information about the rail transportation service for shipment of goods by one or more railcars and the one or more filtering criteria are sent to a server system. The client system receives from the server system information about a filtered pool of rail cars produced by filtering a basic pool of rail ears on the basis of the one or more filtering criteria. Information is displayed at the client system information to the user prompting the user to select at the client system one or more rail cars among the filtered pool of railcars for the shipment of the goods. The information about the one or more rail cars selected by the user for the shipment of the goods is sent to the server system. The client system then receives from the server system information about the price for the shipment of the goods and displays to the user at the client system the information about the price for the shipment of the goods.

In a specific implementation, the information about the rail transportation service includes information specifying an origin of the shipment, a destination of the shipment, a commodity being transported and any other suitable information. In a non-limiting implementation, the first information includes a series of routes among which the user can select at least one route.

In a non-limiting example, the filtering criteria may include information about ownership of the rail cars to be used for the shipment of the goods (such as the party that owns the railcars), information about the type of goods to be shipped and the type of rail car to use for the shipment of the goods or any other suitable criteria.

In a specific implementation, the client system and the server system communicate via the Internet.

In accordance with another broad aspect, the invention provides an apparatus for implementing the above-described method.

In accordance with yet another broad aspect, the invention provides a computer readable medium including a program element suitable for execution by a CPU for computing the price for a railway transportation service for the shipping goods in accordance with the above described method.

In accordance with another broad aspect, the invention provides a server system including a computer readable medium including a program element suitable for execution by a CPU for computing the price for a railway transportation service for the shipping goods in accordance with the above described method.

In accordance with a broad aspect, the invention provides a computer readable storage medium containing a program element for execution by a CPU. The program element includes a first program component for causing a computer to deliver first information to a user prompting the user to enter at the computer information about a rail transportation service for shipment of goods by one or more railcars. The program element also includes a second program component for receiving information about a basic pool of railcars. The second program component implements a filter for filtering the basic pool of railcars based on one or more filtering criteria to produce a filtered pool of railcars. The second program component causes the computer to deliver second information to the user prompting the user to select at the computer one or more railcars among the filtered pool of railcars for the shipment of goods. The program element also includes a third program component for computing a price for the shipment of the goods at least in part on the basis of the information about the rail transportation service and one or more characteristics of the railcars in the filtered pool of railcars selected by the user.

In a first non-limiting implementation, the CPU resides on a server machine and the computer is a client machine in a network arrangement with the server machine. The first program element component generates control messages to the client machine to cause the client machine to display the first information and the second information to the user. The control messages may be HTTP messages or any and the client machine displays the first and second information to the user through a browser.

In a second non-limiting implementation, the CPU resides in the computer.

In accordance to another broad aspect, the invention provides a server system for computing a quote for a price for a railway transportation service for shipping goods. The server system includes a computer readable storage medium storing a program element for execution by a CPU of the type described above.

In accordance to another broad aspect, the invention provides a client server system for computing a quote for a price for a railway transportation service for shipping goods in accordance with the above-described method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A detailed description of examples of implementation of the present invention is provided hereinbelow with reference to the following drawings, in which.

Figure 1:
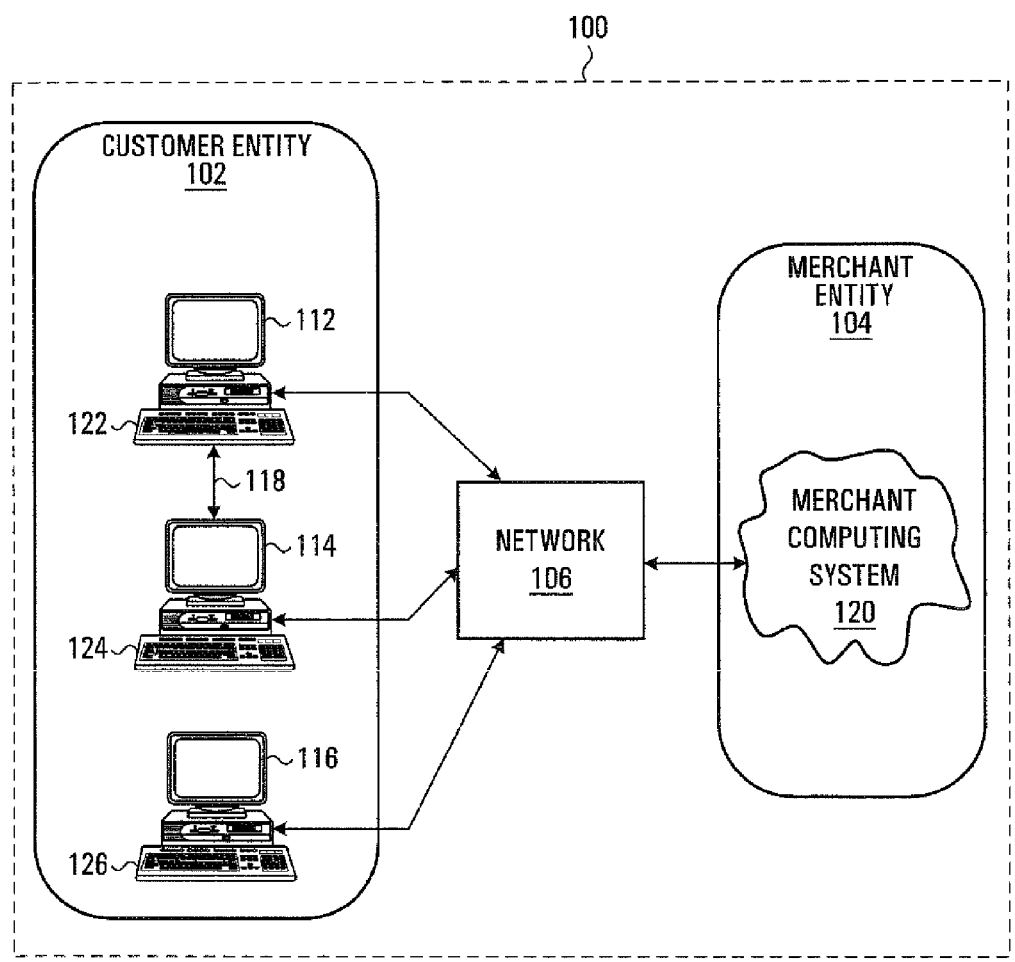
FIG. 1 is a block diagram of an electronic railway price quotation/ordering system suitable for providing price quotations for a railway transportation service in accordance with a non-limiting implementation of the invention, including a merchant computing entity 104, a network 106, and a customer entity 102 having a plurality of computing units.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION

The detailed description below refers to a railway price quotation/ordering system where the transportation services provided are offered by railway carriers using trains and railcars. The skilled person in the art will appreciate that the system described herein below may also be applied to transportation services other than railway transportation services. For example, other transportation services that provide for the transportation of goods from an origin location to a destination location include transportation via trucks, boats, airplanes and combinations of trucks, boats, airplanes and railways.

Shown in FIG. 1 is an electronic railway price quotation/ordering system 100 in accordance with a specific example of implementation of the present invention for providing price quotations for a railway transportation service. As shown, the railway price quotation/ordering system 100 includes a customer entity 102 and a merchant entity 104. For the purposes of this specification, merchant entity 104 is a railway carrier capable of providing railway transportation services The customer entity 102 includes a plurality of customer computing units 112, 114 and 116 and the merchant entity 104 includes a merchant computing system 120. The merchant computing system 120 and the customer computing units 112, 114 and 116 are interconnected through a network 106.

The network 106 is a data communication network interconnecting the customer entity 102 and the merchant computing system 120. In a specific example of implementation, the network 106 is a public network. In the illustrated implementation, the data communication network 106 is embodied in the Internet. It is to be noted that the data communication network 106 may be implemented as a network other than the Internet such as an interactive television network, a private network such as an Intranet, LAN, WAN, VPN or any other suitable network.

The customer entity 102 includes potential customers of the railway price quotation/ordering system 100. In the example shown, the customer entity 102 comprises three computing units 112, 114 and 116 each associated to a respective user 122, 124 and 126. The computing units 112, 114 and 116 are generally in the form of personal computers, although other types of computing units may be used including laptops, notebooks, hand-held computers, set top boxes, and the likes. The computing units 112, 114 and 116 may be connected to one another over an Intranet or may be stand-alone computing units. For example, computing units 112 and 114 are connected over an Intranet 118 and computing unit 116 is a stand-alone unit. Each of the computing units 112, 114 and 116 is provided with a connection to network 106. The connection may be a permanent connection through a server at the customer's premises, or alternatively, a given computing unit may occasionally connect to the network 106 through the use of a dial-up connection using suitable devices such as a modem for example. It will be readily appreciated that customer entity 102 may include less than three computing units as well as more than three computing units.

The merchant computing system 120 and the computing units 112, 114 and 116 include tools for facilitating on-line commerce transactions between the customer entity 102 and the merchant entity 104. Specifically, the electronic railway price quotation/ordering system 100 described above allows a customer to obtain a price quotation for a certain specific railway transportation service over computer network 106 and to order the specific railway transportation service on the basis of the price quotation. The merchant entity 104 is enabled to provide a price quotation for the customer's requested transportation service on the basis of criteria provided by the customer.

Customer Computing Unit 112

Figure 2A:
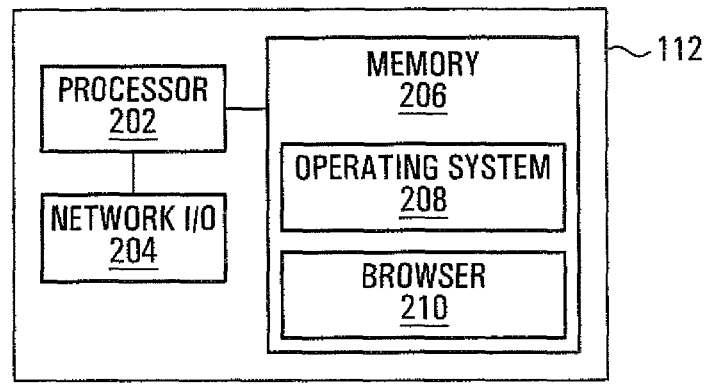
FIG. 2a is a block diagram depicting one of the customer computing units of customer entity 102 shown in FIG. 1 in accordance with a non-limiting implementation of the invention.

FIG. 2A depicts a block diagram of customer computing unit 112. The structure and functionality of customer computing units 114 and 116 are identical to that of customer computing unit 112 and as such will not be described herein.

As shown, customer computing unit 112 comprises a processor 202, a memory 206 and a network I/O 204 (input/output) for accessing network 106. The network I/O 204 can be implemented, for example, as a dial-up modem or as a permanent network connection. The processor 202, which can be a CPU, is adapted to execute program elements stored in the memory 206 for performing certain functions. More specifically, customer computing unit 112 runs an operating system 208 that supports multiple applications. The operating system 208 is preferably a multitasking operating system that allows simultaneous execution of multiple applications in a graphical windowing environment. The memory 206 also includes a browser program element 210. As will be discussed further on in the specification, in a non-limiting implementation, information regarding a desired railway transportation service, a series of routes between an origin location and a destination location and a cost for the railway transportation service is displayed through browser program element 210. When the browser program element 210 is launched, it is executed by the processor 202 atop the operating system 208. The customer computing unit 112 may also include e-mail software components (not shown) as well as additional components and modules. These have been omitted from the description for the purpose of clarity Merchant Computing System 120

The merchant computing system 120 includes one or more computer servers and one or more computing apparatuses, and as such includes a server system. The system includes program elements 218 allowing the merchant entity 104 to manage a user interface that is able to be provided to a computing unit (such as 112) of the customer entity 102 such that the customer at computing unit 112 can obtain a price quote for a certain railway transportation service over network 106.

Figure 2B:
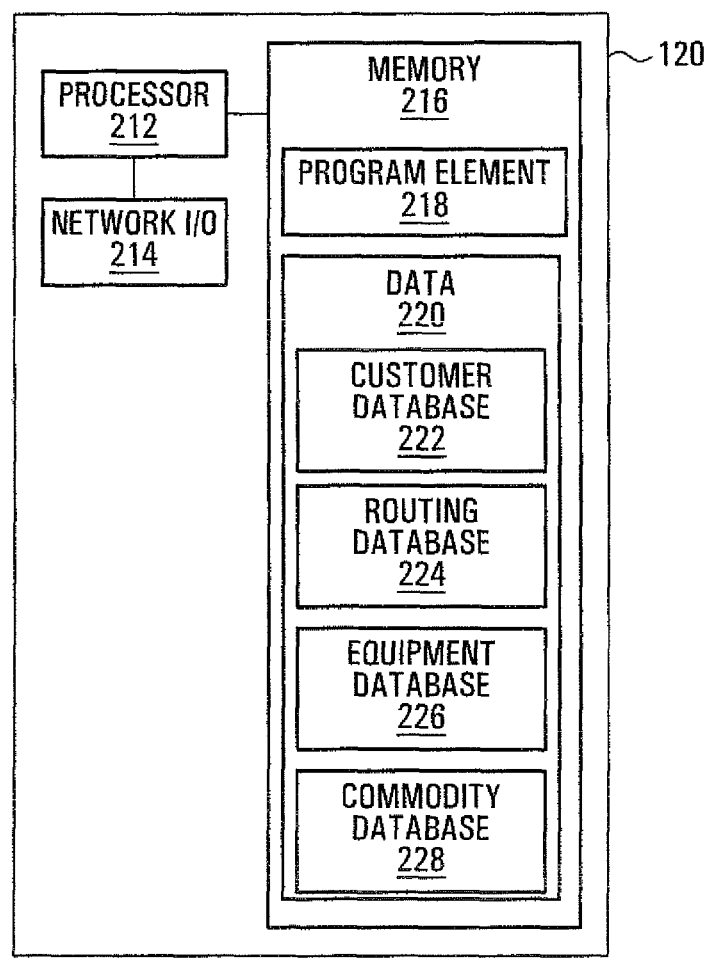
FIG. 2b is a block diagram depicting the merchant computing system 120 shown in FIG. 1 in accordance with a non-limiting implementation of the invention.

FIG. 2B shows a block diagram depicting a schematic diagram of the merchant computing system 120. As depicted, the merchant computing system 120 comprises a processor 212, such as a CPU, a memory 216 and a network I/O 214 (input/output) for connection to the network 106 (shown in FIG. 1). The network I/O 214 is preferably implemented as a permanent network connection, although dial up connections may be suitable in certain embodiments. For example, if the merchant computing system 120 interacts with the customer computing units 112, 114 and 116 via e-mail, then a dial-up connection may be suitable.

In a non-limiting example of implementation, the electronic railway price quotation/ordering system 100 has a permanent network connection to network 106. For clarity, it is this non-limiting example of implementation that will be described in the rest of the specification.

The processor 212 is adapted to execute program elements 218 stored in the memory 216 for performing various functions. The memory 216 also has a data portion 220 including a customer database 222, a routing database 224, an equipment database 226 and a commodity database 228. It will be readily appreciated that the merchant computing system 120 may include additional components and modules that have been omitted from the description for the purpose of clarity.

Customer database 222 includes data elements associated to customers of the merchant entity. Some non-limiting examples of data elements in the database include: a customer identifier, a password, a customer address, customer account information and potential discount rates associated to the customer. It is within the scope of the invention for the customer database 222 to include information regarding equipment (i.e. railcars) belonging to specific customers. As will be described further on in the specification, the customer database 222 is accessed by the merchant computing system 120 when a customer logs on to the merchant entity's website, or when specific customer profile information is needed. A non-limiting example of implementation of customer database 222 is shown below.

TABLE 1

| Customer database | | | |
|---|---|---|---|
| Customer Identifier | Password | Customer address | Discount rate |
| Customer 1 | 12345 | 1234 Green Street HOH OHO | 10% - Overall 20% - For wheat only 15% - For the use of refrigerated cars |
| Customer 2 | 23456 | 4321 Blue Avenue XOX OXO | 15% - Overall |
| Customer 3 | 34567 | 9876 Yellow Drive HAH AHA | 10% - for flatbeds |

Routing database 224 includes data elements associated to segments available in the railway system used by railway carriers, each segment being described by a respective origin junction and destination junction pair. In a non-limiting implementation, the destination junctions are destinations that can be reached from the origin junction without transferring railway carriers. Optionally, the routing database includes the distances between the origin junctions and the destination junctions as well as an average travel time between the origin junctions and the destination junctions. The routing database 224 includes segments belonging to the merchant entity 104 as well as railway segments belonging to other railway carriers. Therefore, the routing database includes the owner associated to each of the segments listed in the routing database 224. It should also be understood that segments can include portions of a route that require transportation other than by railway. A non-limiting example of a routing database is shown below.

TABLE 2

| Routing database | | | | | | |
|---|---|---|---|---|---|---|
| Jct origin | Jct destination | Distance between Jct (km) | Time between Jct (hrs) | Origin factor | Destination factor | Railway Carrier |
| Montreal | Buffalo | 300 | 2.5 | 1.6 | 1.3 | Merchant 1 |
| Montreal | Huntington | 70 | 0.7 | 1.6 | 1.7 | Merchant 2 |
| Buffalo | Baltimore | 250 | 2.1 | 2.4 | 2.2 | Merchant 1 |
| Buffalo | Memphis | 1300 | 10 | 2.4 | 1.9 | Merchant 3 |
| Baltimore | St Louis | 900 | 8.5 | 2.7 | 1.8 | Merchant 2 |
| St Louis | Dallas | 550 | 4.8 | 3.5 | 2.3 | Merchant 2 |
| Memphis | Dallas | 350 | 3.2 | 4.0 | 2.3 | Merchant 3 |

Optionally, although not show in the table above, each segment may also be associated to an ownership factor data element allowing to condition the cost on the basis of the ownership of the segment. The ownership factor for a given segment may further be dependent on the customer making the request.

The equipment database 226 includes a plurality of records associated to respective railcars that can be used to transport goods from an origin location to a destination location. The records include a plurality of fields that include data elements indicating the ownership of the railcar as well as the route segments on which that piece of equipment can be used. As mentioned with respect to the customer database, as a variant the ownership of the railcars belonging to the customers is indicated in the customer database 222. A non-limiting example of implementation of equipment database 226 is shown below:

TABLE 3

Equipment database

| Equipment | Carrying Capacity | Ownership | Ownership Factor | Chargeable services | Price per mile |
| --- | --- | --- | --- | --- | --- |
| Flatbed | 2 tons | Merchant Entity | 1 for all | Cleaning Unloading | 15.95 |
| Flatbed | 1.5 tons | Customer 2 | 0.5 for "Customer 2" 1 for everyone else | Cleaning Unloading | 15.95 |
| Flatbed | 2 tons | Railway Carrier 2 | 0.8 for "Customer 1" 1.5 for everyone else | Cleaning Unloading | 15.95 |
| Tanker | 5 tons | Merchant Entity | 1 | Cleaning Unloading | 20.00 |
| Tanker | 3 tons | Customer 1 | 0.5 for "Customer 1" 1 for everyone else | Cleaning Unloading | 20.00 |
| Boxcar | 2 tons | Merchant Entity | 1 | Cleaning Unloading | 5.95 |
| Boxcar | 3.5 tons | Customer 3 | 0.75 for "Customer 3" 1 for everyone else | Cleaning Unloading | 5.95 |
| Hopper | 6 tons | Merchant Entity | 1 | Cleaning Unloading | 17.99 |

Finally, the commodity database 228 includes data elements corresponding to commodities potentially selected by the customer. Specifically, the commodity database 228 includes data elements corresponding to each commodity including chargeable services, a price per mile and a price per weight for transportation. Optionally, each commodity may also be associated to a list of customers who have a high likelihood of transporting a given commodity. A non-limiting example of implementation of commodity database 228 is shown below:

TABLE 4

Commodity database

| Commodity | Customers who transport commodity | Price per weight | Price per mile | Chargeable services |
| --- | --- | --- | --- | --- |
| Wheat | Customer 1 | 12.00/ton | 2.00 | |
| Wood | Customer 1 Customer 2 | 6.00/ton | 1.99 | |

TABLE 4-continued

Commodity database

| Commodity | Customers who transport commodity | Price per weight | Price per mile | Chargeable services |
| --- | --- | --- | --- | --- |
| Petroleum | Customer 1 Customer 3 | 20.00/ton | 13.00 | |
| Perishable food | Customer 4 | 22.00/ton | 7.00 | Refrigeration |

It is to be expressly understood that other formats for each of the above noted databases are possible without detracting from the spirit of the invention. It should also be expressly understood that other data fields including additional data elements could also be included and omitted without detracting from the spirit of the invention.

The use of each of these databases will be described in greater detail further on in the specification.

System Overview

Figure 3:
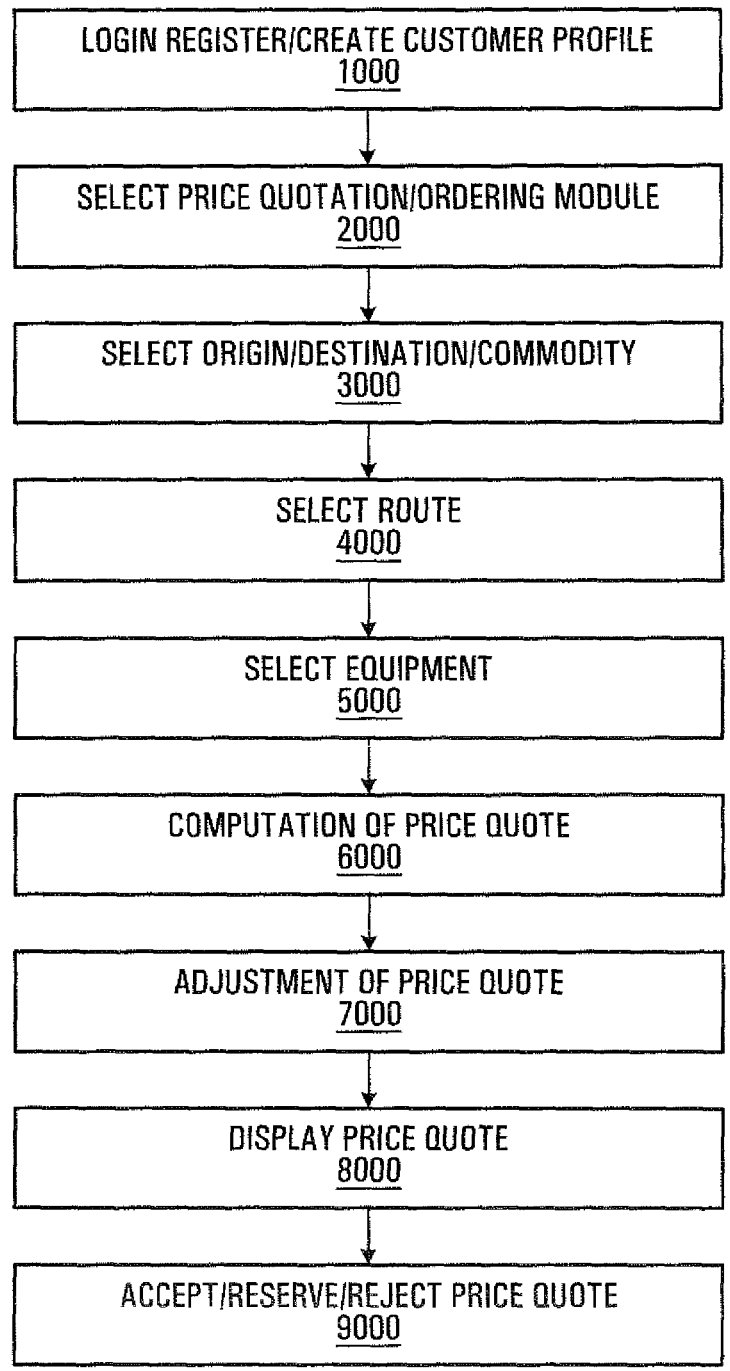
FIG. 3 is a high level flow diagram of the process for electronically providing price quotations for a railway transportation service in accordance with a non-limiting specific example of implementation of the present invention.

With reference to FIG. 3, the overall interaction between a customer at the customer entity 102 and the merchant entity 104 is described in relation to the railway price quotation/ordering system 100 according to an example of implementation of the present invention.

Firstly, at step 1000 the customer accesses the merchant entity's secure website by either entering a user ID and password, or by registering as a new customer. Once the customer's identity has been verified by the merchant computing system 120, the customer is granted access to the merchant entity's website.

At step 2000, the customer is presented with a graphical user interface indicative of the merchant entity's home page. The graphical user interface provides a number of links to various services and products offered by the merchant entity 104. In the context of the railway price quotation/ordering system 100, a link to the railway price quotation/ordering module is provided. The user selects the railway price quotation/ordering module link from the plurality of links through an input device such as a pointing device, keyboard, touch sensitive surface, speech recognition unit or other suitable input device.

At step 3000, the graphical user interface includes a set of data fields that are modifiable by the customer for specifying a desired railway transportation service. The customer is enabled to enter via the user interface the origin location and the destination location of the railway transportation service desired. The customer is also enabled to enter the type and weight of the commodity, which is to be transported between the origin location and the destination location. Optionally, the customer is enabled to enter the preferred dates for which the transportation service is required. The dates may include an hour, day, month, year or season. Once the above-described information is provided, the customer submits this information to the merchant entity 104 via network 106.

At step 4000, the program element 218 at the merchant computing system 120 receives and processes the origin location and the destination location submitted by the customer to derive a list of transportation routes between the origin location and destination location. The merchant computing system 120 then forwards the list of transportation routes to the customer's computing unit, which displays the routes to the customer through a graphical user interface. The customer is then enabled to select one of the routes for the transportation service through the user interface using an input device such as a pointing device, keyboard, touch sensitive surface, speech recognition unit or other suitable input device.

At step 5000, the program element 218 at the merchant entity processes the commodity type and the weight information to derive a list of suitable equipment for transporting the commodity. The merchant computing system 120 then forwards the list of equipment to the customer's computing unit which in turn displays the list of equipment to the customer through the graphical user interface. The customer is then enabled to select the desired equipment to be used during transportation from a list of possible railcars through the user interface using an input device such as a pointing device, keyboard, touch sensitive surface, speech recognition unit or other suitable input device. Optionally, the graphical user interface may also enable the customer to select customized chargeable services and submit the selections to the merchant entity 104.

It will be readily apparent to the person skilled in the art that the order of steps 4000 and 5000 may be interchanged or, alternatively, steps 4000 and 5000 may be performed concurrently without detracting from the spirit of the invention.

At step 6000, the program element 218 at the merchant computing system 120 generates a price quotation at least in part on the basis of the origin location, destination location, weight and type of commodity selected at step 3000, the route selected at step 4000, and the equipment ownership and chargeable services selected at step 5000.

Optionally, at step 7000, the merchant computing system 120 applies marketing and promotional information in order to effect a price adjustment of the price quotation generated at step 6000.

At step 8000, the merchant computing system 120 then forwards the price quotation to the customer's computing unit, which displays the price quotation to the customer through a graphical user interface.

At step 9000, the customer is enabled to accept the price quotation or reject the price quotation. Optionally, the customer is enabled to save the price quotation in a database located at the merchant computing system and delay making a decision until a later time. In such an implementation, the price quotation provided at step 8000 is associated to a time delay during which the price quotation is valid.

Each of the above mentioned steps will be described in greater detail hereinbelow.

Login or Register/Create a Customer Profile (Step 1000)

Figure 4:
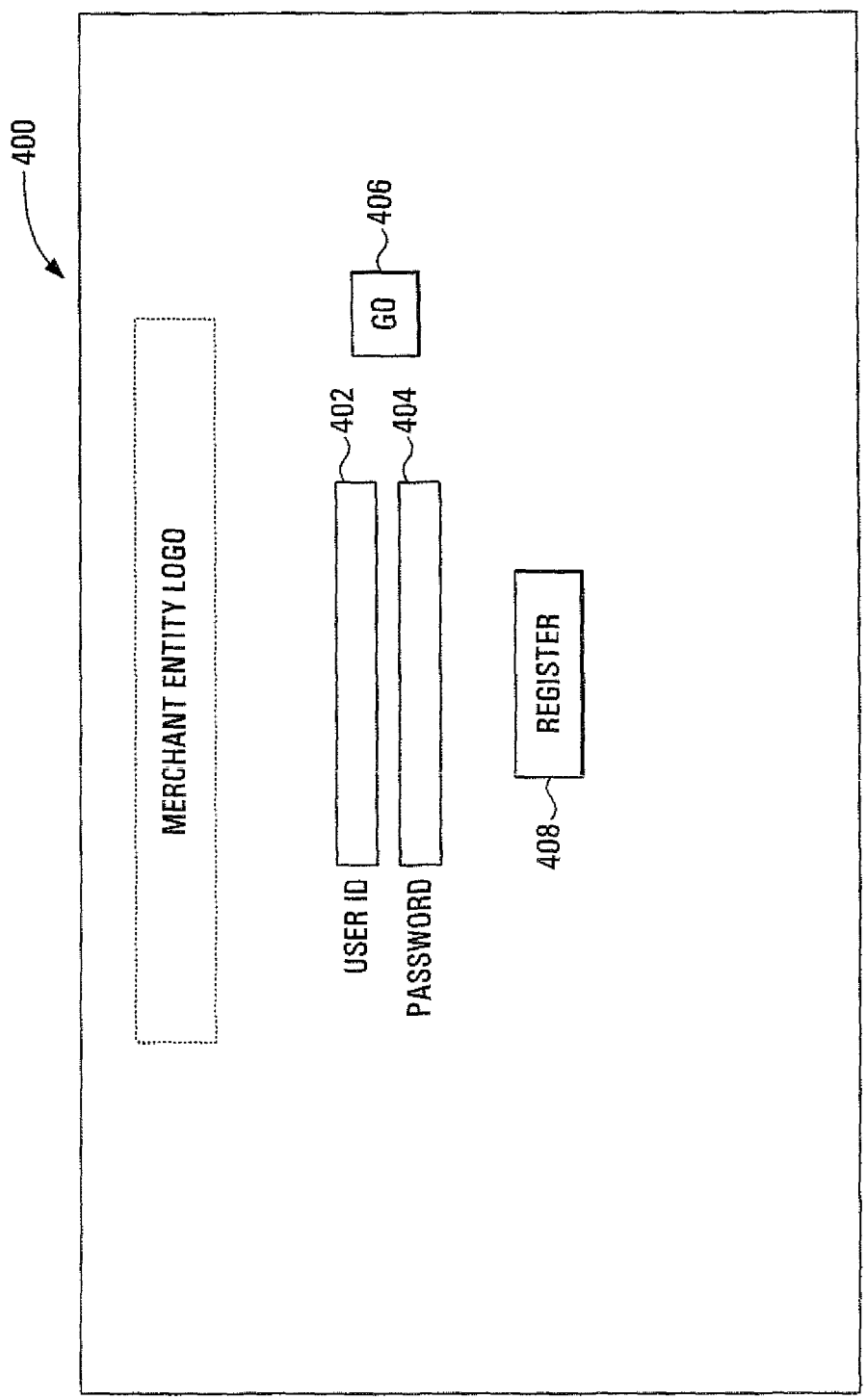
FIG. 4 depicts a user interface for allowing a user to logon or to register with the electronic railway price quotation/ordering system 100 in accordance with a specific example of implementation of the present invention.

In order to access the electronic railway price quotation/ordering system 100, a customer at computing unit 112 invokes browser 210 and enters the merchant entity's specific network address. It should be expressly understood that a customer may be a user of any computing unit within customer entity 102 that accesses the railway price quotation/ordering system 100. For the purposes of this description, the user 122 at customer computing unit 112 will be called customer 122 to indicate that user 122 is ordering a service from merchant entity 104. In a non-limiting example of implementation, once customer 122 has entered the merchant entity's network address, the browser 210 displays a webpage on the customer computing unit 112. In such an implementation, the customer is first presented with a "login/registration" webpage. A non-limiting example of a "login/registration" webpage 400 is shown in FIG. 4.

Prior to being able to access the railway price quotation/ordering system, the customer either logs into the merchant entity's "login/registration" page 400 by entering a userID and password, or alternatively registers as a new user of the railway price quotation/ordering service. If the customer is a "registered customer", meaning that the customer has previously registered and has been approved by the merchant entity, then the customer simply provides the merchant entity with a userID and an associated password each time the customer desires to access the railway price quotation/ordering system 100. As can be seen in FIG. 4, in a non-limiting example of implementation, a registered user enters the userID and associated password into customer modifiable data fields 402 and 404 respectively, and then clicks the "go" button 406 in order to submit this information to merchant entity 104. It is this login information that allows the merchant entity 104 to access the customer profile in the customer database 222.

When a "registered customer" enters a userID and a password, the merchant entity 104 receives this login information and processes it with respect to the customer database 222. More specifically, the processor 212 accesses the customer database 222 to locate the entry corresponding to the userID. If no corresponding entry is found in the customer database 222, an error message is returned to the customer. If a corresponding entry is found, the password in the entry in the customer database 222 is compared to the password provided in the login information. If a match is not found, an error message is returned to the customer. If a match is found, the customer is successfully identified and is granted access to the website.

If the customer accessing the "login/registration" page 400 is not registered, the user launches the registration process by selecting a corresponding link to a "registration" webpage. The user can select the "registration" webpage through an input device such as a pointing device, keyboard, touch sensitive surface, speech recognition unit or other suitable input device. In the non-limiting example of implementation depicted in FIG. 4, customer 122 launches the "registration" webpage by selecting the "register" button 408.

Figure 5:
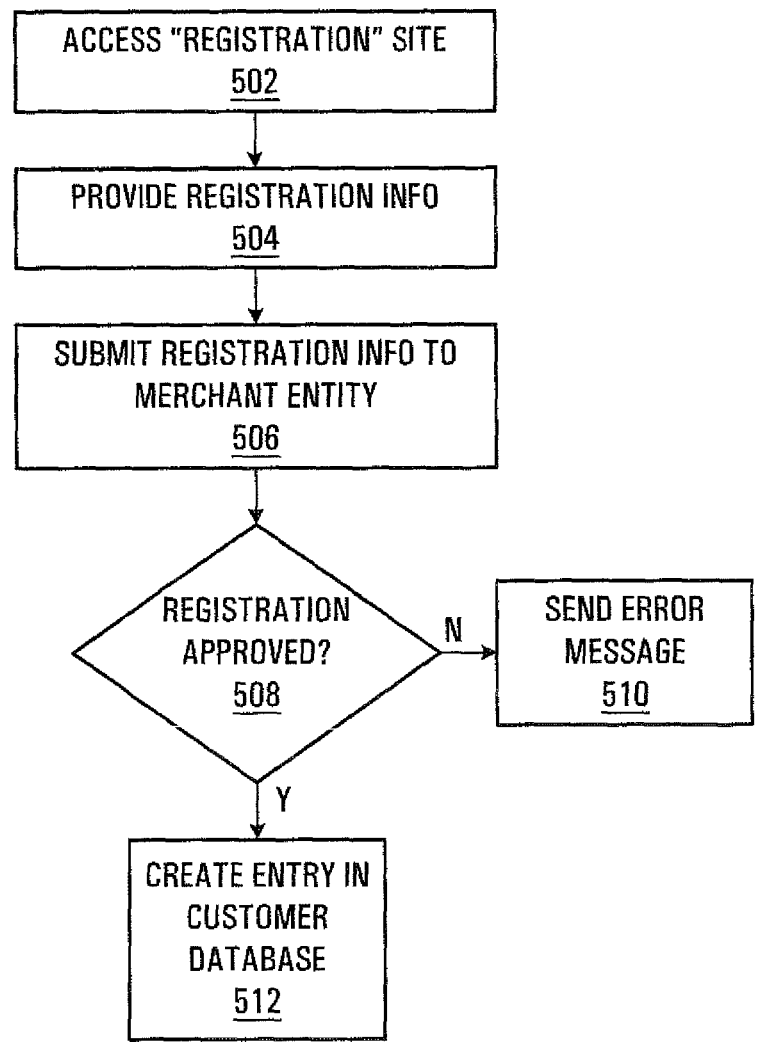
FIG. 5 is a flow diagram of a customer registration process for the electronic railway price quotation/ordering system 100 in accordance with a specific example of implementation of the present invention.

With reference to FIG. 5, the registration process will be described below. At step 502, customer 122 launches the "registration" webpage (no Figure), and customer computing unit 112 downloads a registration module implemented by program element 218 (shown in FIG. 2B) from the merchant computing system 120. The registration module automatically launches to aid customer 122 in the completion of the online application for registration. In a specific example of implementation, the registration module is configured to provide step-by-step instructions. At step 504, customer 122 fills out the registration form that includes various fields relating to personal and financial matters, such as company name, address, telephone number, credit card numbers, bank affiliations, and the like. Customer 122 also provides data related to preferred payment methods, a userID and an associated password. Optionally, the "registration" webpage may include data fields prompting the customer to enter information about railcars that are owned by the customer. Some of these information fields may be omitted and others added without detracting from the spirit of the invention.

It is possible that customer computing units 112 and 114 will have the same customer registration information since they are connected via an intranet 118. In a non-limiting example, computing units 112 and 114 belong to a single company and the registration information provided to the merchant entity 104 pertains to the company and not to the individual users of computing units 112 and 114. As such, both customers 122 and 124 may use the same userID and password when accessing the railway price quotation/ordering system 100.

As a variant, it is possible that the registration between the customer and the merchant entity may be effected through the completion of a form that is transmitted to the merchant entity 104 by mail, fax or other suitable transmission method. These methods will be readily apparent to the reader skilled in the art.

Once the application for registration is completed, at step 506 the application for registration is submitted to the merchant entity 104. The registration module facilitates this communication between the customer computing unit 112 and the merchant entity 104. The registration module itself includes the necessary routing information to direct the application over the network 106 to the merchant computing system 120. At step 508, the merchant entity 104 reviews the application for registration to determine whether customer 122 should be permitted to register and whether any information is missing. If registration is denied, for example information is missing, the customer is already registered, or the customer requesting registration does not have permission to do so, at step 510 the merchant entity 104 returns a message to the customer 122 indicating that the application for registration has been denied. Conversely, if the application is granted, at step 512 the merchant entity 104 may return a message indicating that the application for registration is successful.

Assuming that the application for registration is granted, at step 512 the merchant computing system 120 at the merchant entity 104 creates a customer account entry in customer database 222 (as described and shown previously in the specification). The customer database 222 includes information pertaining to the customers of the merchant entity 104. In a non-limiting example of implementation, for each customer entity, an entry is provided including various information data elements associated to the user. Amongst others, each entry includes a customer identifier and a corresponding password. Optionally, each customer identifier is associated to a respective customer profile including customer characteristics that may be used by program elements 218 to condition the price quotation to be generated. Such information may include without being limited to, information indicating a discount rate to which the customer is entitled. This will be discussed in more detail in the section entitled "marketing options and "adjustment of price quotation". In accordance with a non-limiting implementation, until the merchant entity 104 has reviewed the customer's registration information, the "new customer" has only limited interaction capabilities with the railway price quotation/ordering system 100.

As a variant to the electronic railway transportation registration system 100, the accessing of a registration page is not required in order for a customer to access the merchant entity's homepage or the "railway transportation ordering" page of the electronic railway price quotation/ordering system 100. Under this variant, an unregistered customer can skip step 1000 and access the "railway transportation ordering" page directly, so as to be able to enter information regarding a specific railway transportation service that is desired and obtain a price quote for that service. If the user desires to accept the price quote, it is at this stage that the user completes the registration process in order to provide the merchant entity 104 with information regarding the customer.

Selecting the Railway Price Quotation/Ordering System (Step 2000)

Figure 6:
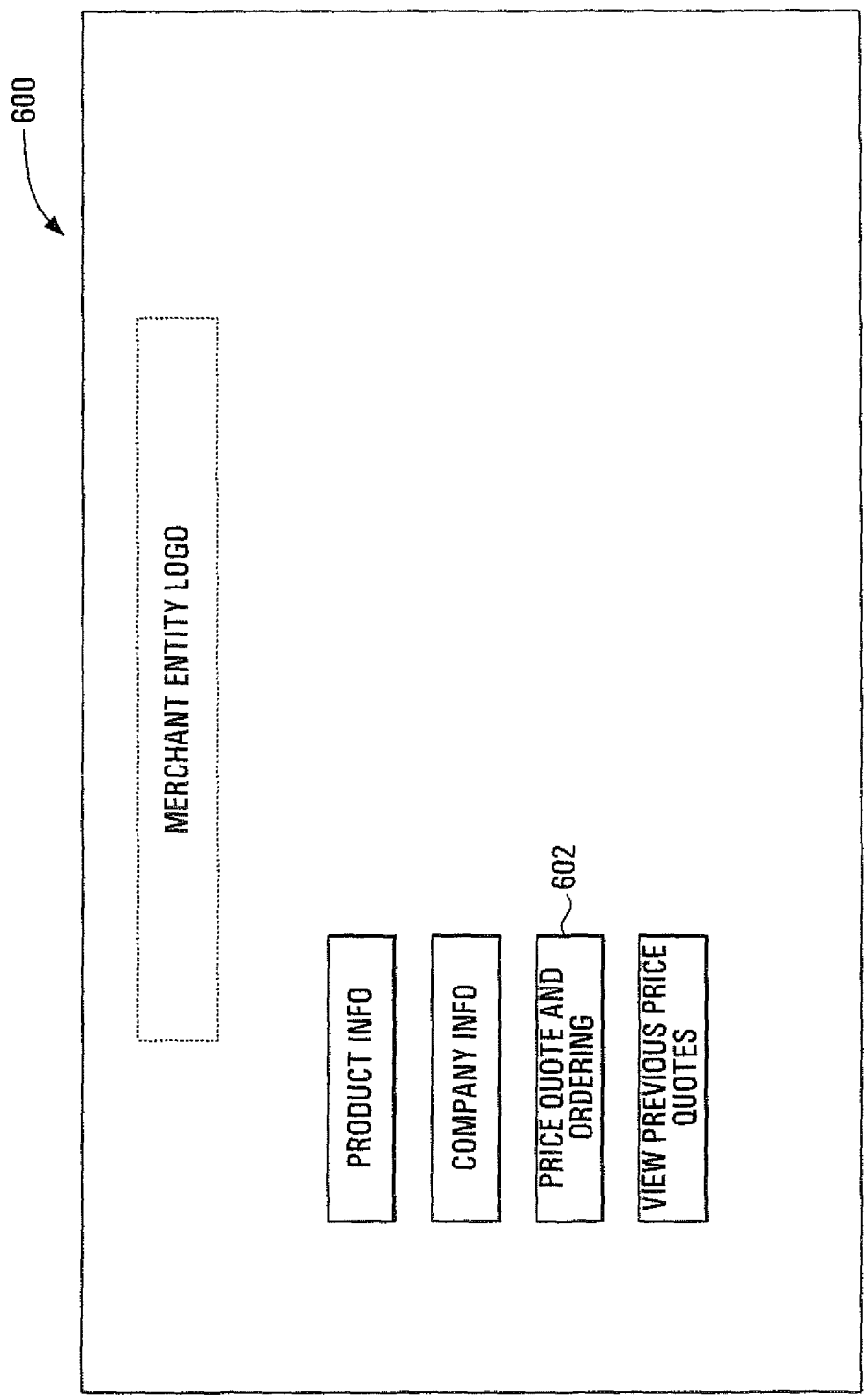
FIG. 6 depicts a user interface for allowing a user to select the electronic railway price quotation/ordering system from a set of choices in accordance with a specific example of implementation of the present invention.

Once the customer has been successfully identified by the login process, or has successfully completed the registration form, customer computing unit 112 downloads a module representative of the merchant entity's "home" site for displaying on the screen of the customer computing unit 112. FIG. 6 shows a simplified non-limiting example of the merchant entity's "home" site 600. The "home" site is implemented by program element 218 from the merchant computing system 120 and automatically launches to aid customer 122. The railway price quotation/ordering system 100 is part of an electronic-commerce platform provided by the merchant entity 104 to support various electronic-commerce activities. As can be seen, the "home" site 600 provides a number of links to various services and products offered by the merchant entity 104. In the context of the railway price quotation/ordering system 100, a link 602 to the railway price quotation/ordering module is provided. The merchant entity's "home" site may also include a link entitled "view previous price quotes" which provide customers with the ability to view previously accepted quotes listed by such things as "quotes by customer", "quotes by account" and "quotes by contact".

In the non-limiting example of implementation shown in FIG. 4, in order to request a price quote for a railway transportation service, the customer 122 selects the "price quote and ordering" button 602 from the merchant entity's "home" site 600. This is done through an input device such as a pointing device, keyboard, touch sensitive surface, speech recognition unit or other suitable input device. Once selected, the "home" site module 600 facilitates the communication of this choice to the merchant entity 104. The "home" site module itself includes the necessary routing information to direct the choice selected by customer 122 to the merchant computing system 120 over network 106.

Select Origin Location, Destination Location and Commodity (Step 3000)

Figure 7:
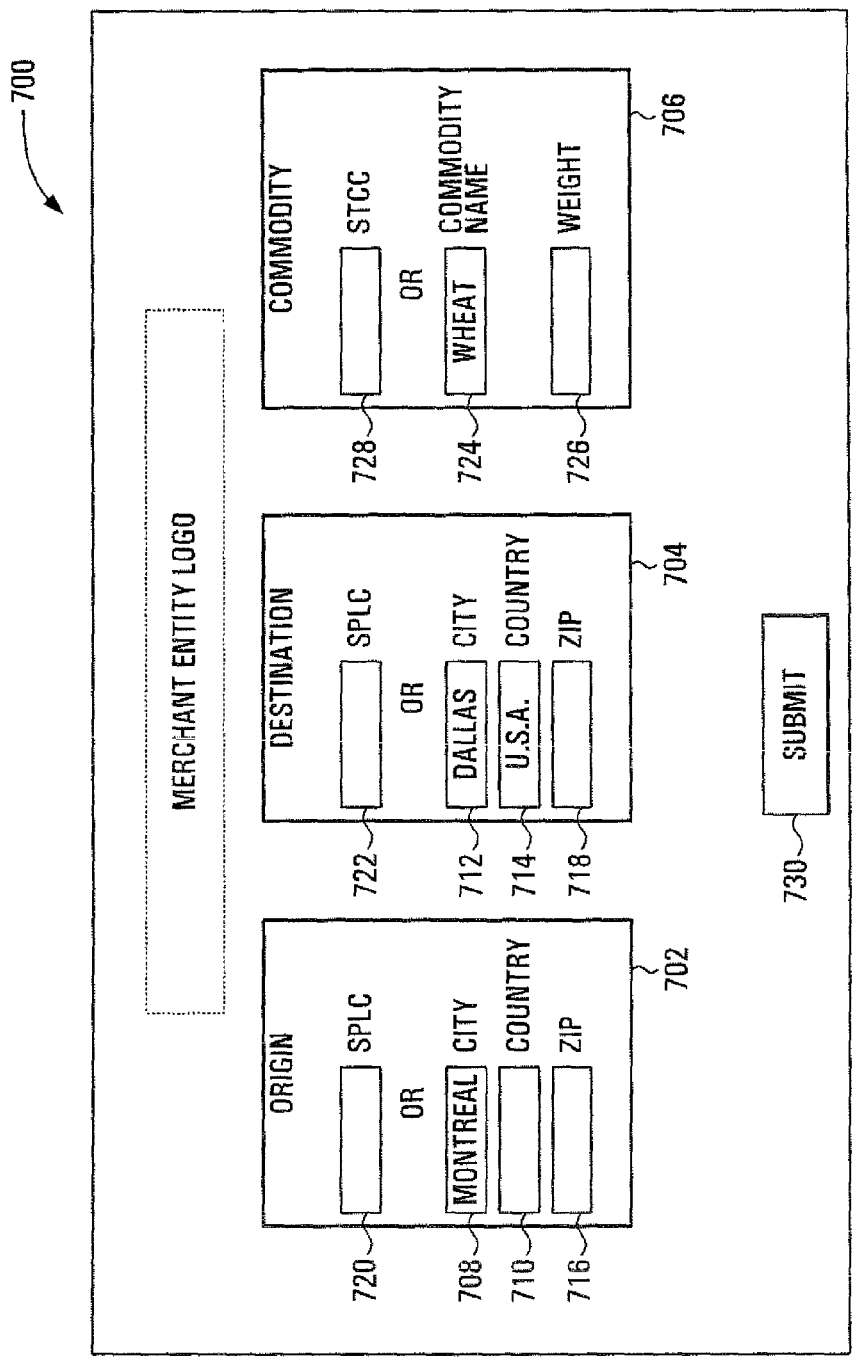
FIG. 7 depicts a user interface displaying a "railway transportation ordering" page 700 of the electronic railway price quotation/ordering system in accordance with a specific example of implementation of the present invention.

After selecting the "price quote and ordering" link 602 from the merchant entity's "home" site 600, a "railway transportation ordering" page is launched at customer computing unit 112. The "railway transportation ordering" page is implemented by program element 218 (shown in FIG. 2b) at the merchant computing system 120. The program element 218 generates control messages to the customer computing unit 112 to cause the customer computing unit 112 to display information in the form of "railway transportation ordering" page to the customer. In a specific example of implementation the control messages are HTTP messages. The "railway transportation ordering" page automatically launches to aid customer 122 in filling out the customer modifiable data fields located on the "railway transportation ordering" page, thereby prompting the user to enter information regarding a desired rail transportation service. In a specific example of implementation, the "railway transportation ordering" page is configured to provide step-by-step instructions. In a non-limiting example of implementation, the "railway transportation ordering" page is a graphical user interface implementing a form that is modifiable by the customer and which is suitable to be displayed on the screen of the customer computer unit 112 by browser program element 210. Shown in FIG. 7, is a non-limiting example of the "railway transportation ordering" page 700. In a non-limiting example of implementation, the customer 122 fills out the customer-modifiable data fields in order to enter information about a rail transportation service for the shipment of goods, such as a desired origin location, destination location, commodity type and commodity weight. The shipment of goods can be transported by one or more railcars.

As can be seen in FIG. 7, there are a set 702 of customer modifiable data fields for the origin location, a set 704 of customer modifiable data fields for the destination location, and a set 706 of customer modifiable data fields for the commodity. Optionally, although not shown in FIG. 7, the graphical user interface can include customer modifiable data fields relating to customer account information and preferred dates of transportation. Some of these information fields may be omitted and other information fields added without detracting from the spirit of the invention.

It will be readily apparent that there are numerous ways for the user to provide the information regarding the origin location, the destination location, and the commodity. The user can enter the information about the desired rail transportation service into the computer modifiable data fields through an input device selected from the group consisting of keyboard, pointing device, touch sensitive surface and speech recognition unit.

In a first non-limiting example of implementation, in order to specify the origin location and the destination location of transportation, the customer can enter the name of the country, city and street address. These are shown as customer modifiable data fields 708, 710, 712 and 714 on FIG. 7.

Alternatively, in a second non-limiting example of implementation, the customer may enter a zip code, shown as data fields 716 and 718 in FIG. 7 (the zip code can be of any number of digits such as the Canadian 6 digit zip code, the U.S. 5 digit zip code or any other type of zip code).

In a third non-limiting example of implementation, the customer may enter a standard point location code (SPLC), data fields 720 and 722, or a freight station accounting code (FSAC).

Optionally, the customer modifiable fields depicted in FIG. 7 may be enabled/disabled on the basis of the information already entered by the user. For instance, if the user specifies the origin location with an SPLC, then the city, country and zip field may be automatically disabled by the user interface. Similarly, if the user specifies the origin location with the city, country or with the zip code, the SPLC may also be automatically disabled. The same type of feature may be provided by the user interface for the destination location and for the commodity information.

It is within the scope of the invention for the merchant entity 104 to be able to provide an intermodal transportation service based on the origin location and destination location entered by the customer. For example, if the customer enters a zip code to specify the origin location and there is no train station within the region covered by that zip code, then the merchant entity can use another form of transportation, such as a truck, to transport the commodity from the customer's origin location to the closest train station. Similarly, the customer may specify the desired destination location with a zip code that covers a region that does not include a train station. In these situations the merchant entity will provide an alternate form of transportation from the origin location to the closest train station and from the terminal train station to the desired destination location. As such, the merchant entity is able to provide a door-to-door transportation service to the customer.

The merchant entity 104 is able to calculate the distance to the closest train station based on the zip code, or other origin location information provided by the customer.

Although not shown in FIG. 7, in a fourth non-limiting example of implementation, the customer may simply select the desired origin location and destination location from a pull-down list of possible locations. Such a list may include a list of the origin/destination locations available for the railway transportation service.

Although not shown in FIG. 7, in a fifth non-limiting example of implementation, the graphical user interface may include an interactive map allowing the customer to select a desired location of origin and destination by activating the selections through an input device such as a pointing device, keyboard, touch sensitive surface, speech recognition unit or other suitable input device. In this alternative implementation, the interactive map depicts a plurality of locations at which origin and destination location are depicted and associated to links allowing selection by the user.

Other suitable embodiments for selecting origin and destination locations through a user interface are possible without detracting from the spirit of the invention.

The desired commodity, as well as the weight or volume of the commodity to be transported, may also be specified in various ways. The type of commodity can be selected from the set consisting of, but not limited to, liquids, solids, logs, granular, grain type, commodity type, explosives, and hazardous materials. As a non-limiting example, the commodity may be specified by entering into data fields 724 and 726 the commodity's common written name and the weight of the commodity can be entered using well known units of measure (UOM), such as pounds, kilograms or cubic inches. Alternatively, the user may specify the commodity by entering the commodity's seven digit STCC code (standard transportation commodity classification) or a subset of the commodity's seven digit STCC into data field 728. It will be apparent that although this specific implementation describes the transportation of a commodity, any good suitable for rail transportation may be specified without detracting from the spirit of the invention.

It is within the scope of the invention for the graphical user interface of the "railway transportation ordering" page 700 to be configured such as to be customer specific, thereby including specific information regarding the customer currently accessing the page. For example, if it is known from the customer profile that customer 122 only transports wheat and wood, then in the commodity selection area 706, only the choice of wheat and corn will be available to the customer. Alternatively, if it is known from the customer profile that customer 122 usually transports wheat from Montreal to Dallas, then default values for the customer modifiable fields may be set accordingly such as to reduce the time required for the user to enter the information. In the specific example shown in FIG. 7, the origin location 702, the destination location 704, and the commodity 706 are set respectively to "Montreal", "Dallas" and "Wheat".

Once the necessary information has been entered into the "railway transportation ordering" page 700, the information entered into the customer modifiable data fields is submitted to the merchant entity 104. This may be accomplished through an input device such as a pointing device, keyboard, touch sensitive surface, speech recognition unit or other suitable input device. In the specific example shown in FIG. 7, the customer submits the information entered into the graphical user interface by selecting the "submit" button 730 with a pointer device. The "railway transportation ordering" page 700 includes routing information to direct the information entered by customer 122 to the merchant entity 104. As such, the customer computing unit 112 is operative to communicate with the merchant entity 104. It should be noted that the price quote computed later on can be based at least in part on the information supplied by the customer at the "railway transportation ordering" page 700 about the rail transportation service desired.

Select a Route (Step 4000)

Upon receipt of the customer's desired origin location and destination location, the program element 218 of the merchant computing system 120 is responsive to the desired origin location and destination location and accesses routing database 224 (FIG. 2B). As explained above, the routing database 224 stores a list of segments in the form of {origin junction, destination junction} pairs for railway routes. The processor 212 applies a route determination algorithm implemented by program element 218 to the information stored in the routing database 224 with respect to the customer's desired origin location and destination location. The route determination algorithm determines a series of combinations of segments that can be joined so as to form a route between the origin location and the destination location. Identifying a combination of segments between an origin location and a destination location based on predefined segments may be done using any suitable method.

In accordance with a variant of the invention, a segment may be traveled by a carrier other than a train such as for example a truck, a boat, airplane or any other suitable vehicle. For example, if the transportation service desired by the customer requires a truck to transport goods from the specific origin location to a train station in the area, then the journey by truck to the train station can be considered a first segment, and the journey by train can include one or more additional segments. In addition, the final segment can be a journey by truck from a termination train station to the specific destination location specified by the customer. All segments of the route include respective origin location and destination locations and in general, the destination of the first segment coincides with the origin of the second segment, the destination of the second segment coincides with the origin of the third segment and so on.

In this variant, the customer enters into the "railway transportation ordering" page an origin location, which is information conveying a characteristic of the first segment of the transportation route. As a specific example, the zip code entered by the customer identifying an origin location is a characteristic of the first segment of the route. It should be understood that other information conveying an origin location of the first segment are included within the scope of the invention, such as country, city, and street address. The user may also enter at the "railway transportation ordering" page information conveying a characteristic of the second segment of the journey, such as origin location of the second segment. As a specific example, the zip code or other origin location identifier entered by the customer to identify the origin location of the first segment can also convey the origin location of the second segment. For example, with the origin location of first segment, the program element 218 at the merchant entity 104 can identify the closest train station to the origin location and as such identify the origin location of the second segment. In this case, the train station is the origin location of the second segment. It is to be appreciated that although in this example the information conveying an origin location of the second segment is derived from the information conveying the origin location of the first segment, it is within the scope of the invention for the customer to provide information conveying the origin location of the second segment separately from that of the first segment. In addition, the customer may enter information identifying the destination of one or all of the segments contained within the route. The customer enters information conveying one or more characteristic of the first segment and the second segment through an input device selected in the group consisting of keyboard, pointing device, touch sensitive surface and speech recognition unit.

Generally, two or more routes are derived for a given origin location and a destination location requested by a customer. However, it will be readily appreciated that for certain origin locations and destination locations only one existing route between an origin location and a destination location will exist amongst the segments in the route database 224 and such cases remain within the scope of the invention. It is to be appreciated that the series of combinations of segments forming routes between the origin location and the destination location need not be an exhausted list of all possible routes between the origin location and the destination location but may be a subset thereof without detracting from the spirit of the invention. The invention is not limited to the manner in which the subset of routes from the list of possible routes is determined.

An example of interaction between customer 122 and merchant entity 104 will better illustrate the above. On the "railway transportation ordering" page 700, customer 122 selects Montreal as the origin location and Dallas as the destination location. The merchant entity 104 receives the selected origin location (Montreal) and the destination location (Dallas) and applies the algorithm to the information stored in the routing database 224 to derive possible routes between Montreal and Dallas. From the routing database 224, shown in table 2 above, there are at least two routes possible between Montreal and Dallas, namely:

Route 1
Montreal to Buffalo using merchant 1 followed by
Buffalo to Baltimore using merchant 1 followed by
Baltimore to St Louis using merchant 2 followed by
St Louis to Dallas using merchant 2.
Route 2
Montreal to Buffalo using merchant 1 followed by
Buffalo to Memphis using merchant 3 followed by
Memphis to Dallas using merchant 3.

Figure 8:
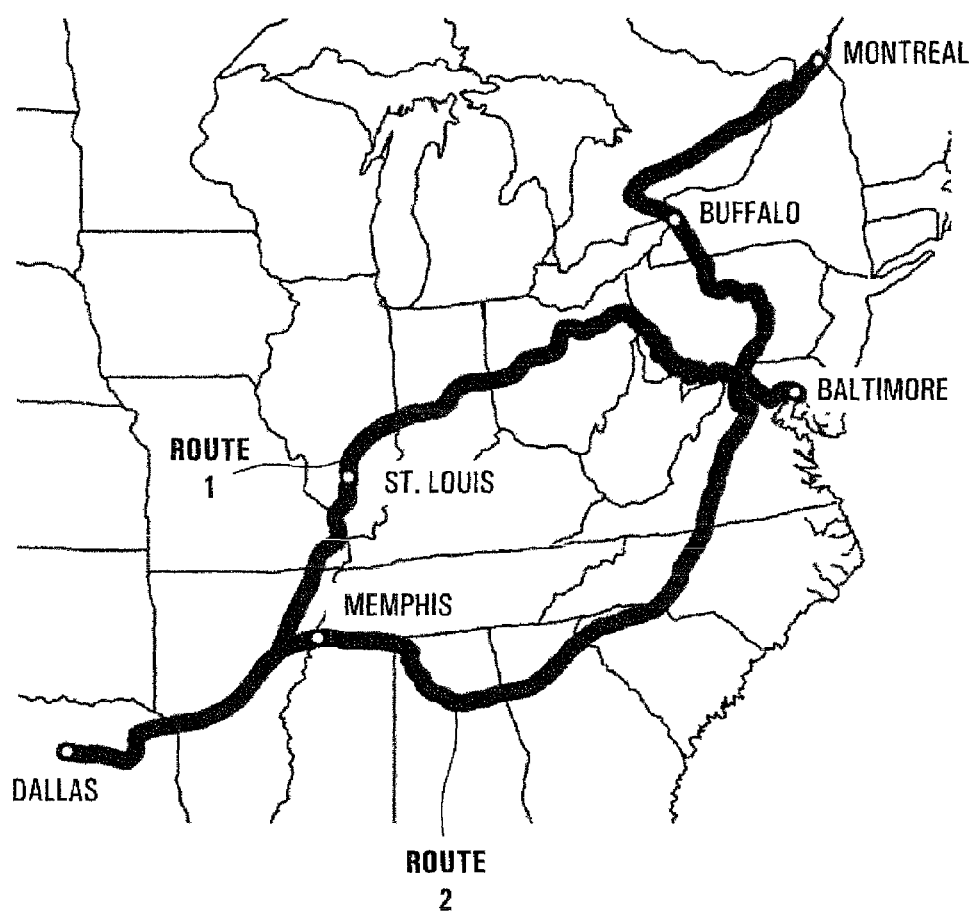
FIG. 8 illustrates a graphical representation of two different routes between Montreal and Dallas on a geographical map.

FIG. 8 illustrates a graphical representation of these two routes on a geographical map. The series of routes between the origin location and the destination location is displayed in the form of paths drawn on the graphical representation of a geographical map.

Program element 218 is operative for interfacing with a database, such as routing database 224, that maps information identifying route segments and identifying the respective merchant railway carriers that own the route segments in order to generate a series of routes having segments owned by a certain owner.

In a specific example of implementation, the algorithm deriving the list of routes from the origin location to the destination location is biased on the basis of the ownership of the segments of the routes. For example, the algorithm deriving the list of routes from the origin location to the destination location can make use of the ownership of the segments in the routing database 224 to bias the list of routes to favor railway routes having segments belonging to the merchant entity 104.

For example, in cases where the merchant entity 104 can transport a commodity from the specified origin location to the specified destination location without the use of railway routes having segments belonging to a railway carrier other than the merchant entity 104, the routes that use the rail segments belonging to the merchant entity 104 are provided to the customer for selection. For example, when the origin is Montreal and the destination is Vancouver, and there are seven (7) different routes that can be taken between Montreal and Vancouver and two (2) of the routes require only railway segments belonging to the merchant entity, and the remaining five (5) routes require the use of rail segments belonging to a railway carrier other than the merchant entity, then only the two routes that use railway segments belonging to the merchant entity are displayed to the customer. In another example, the routes that use railway routes having at least one segment belonging to the merchant entity 104 are provided to the customer for selection. In such implementations, the rules for the selection of the routes for inclusion in the series of routes presented to the customer are based on a pre-determined segment owner, namely the merchant entity. Alternatively, the user may desire to have the algorithm determine a list of routes based on a merchant railroad carrier other than the merchant entity, that is selected by the user.

It is to be appreciated that heuristics rules for biasing the selection of the routes for inclusion in the series of routes for presentation to the customer entity 102 may also bias the selection toward rail segments belonging to railway carriers other than the merchant entity. For instance, the selection may be biased toward railway carrier with which the merchant entity has some strategic alliances. As such, routes that include rail segments belonging to railway carriers having strategic relationships with the merchant entity 104 are given a preferential treatment over routes that include rail segments belonging to railway carriers not having strategic relationships with the merchant entity 104. As such, the series of routes presented to the customer is a subset of a set of all possible routes between the origin of the shipment of goods and the destination of the shipment of goods.

Once program element 218 has derived a list of routes between the origin location and the destination location, the list of routes is transmitted over network 106 to customer computing unit 112 on a "route display" page that is downloaded by computing unit 112. The "route display" page automatically launches at computing unit 112 to display on the screen of the customer computing unit 112 the list of derived routes. The "route display" page is implemented by program element 218 from the merchant computing system 120 and automatically launches to aid customer 122.

Figure 9:
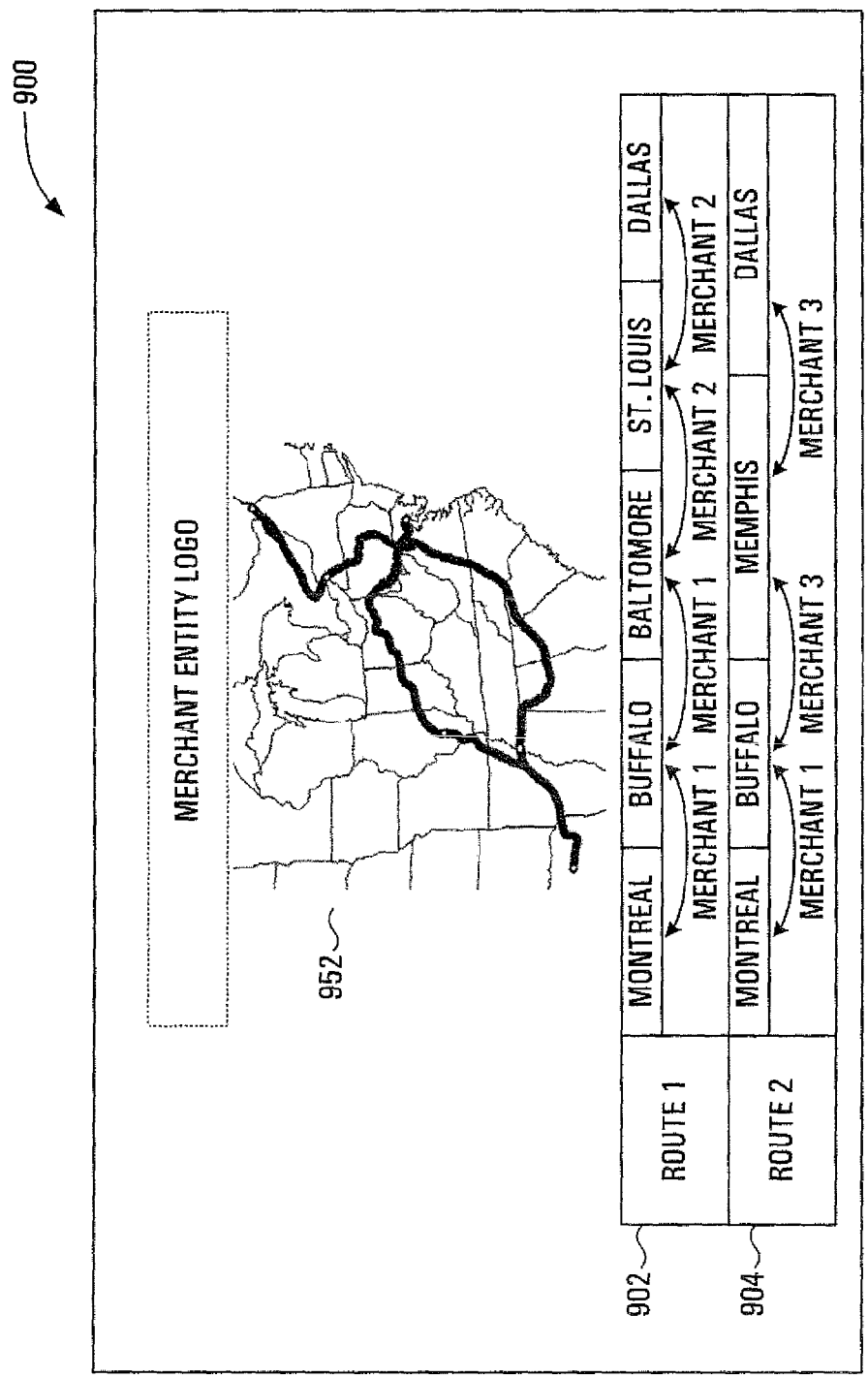
FIG. 9 shows a user interface depicting a "route display" page 900 of the electronic railway price quotation/ordering system in accordance with a specific example of implementation of the present invention.

Shown in FIG. 9 is a non-limiting example of the "route display" page 900 launched at the customer computing unit 112. As can be seen, the series of routes is displayed in the form of a table, with each route presented as a row, showing each junction in the route as well as the merchant railroad carrier used for transportation. It is within the scope of the invention for the "route display" page 900 to indicate the distance between each junction and the total distance for each route. It should be noted that the route is divided into segments, each segment being the trip between two junctions.

Customer 122 may select a desired route from the list of routes displayed through an input device such as a pointing device, keyboard, touch sensitive surface, speech recognition unit or other suitable input device. In the specific example shown in FIG. 9, the customer selects and submits the choice of route simply by selecting either the "route 1" button 902 or the "route 2" button 904. Alternatively, the customer selects and submits the choice of route simply by selecting the route on the graphical representation of the geographical map 906.

Optionally, the user interface provides an option allowing the user to request the merchant system to effect the route selection on the basis of a certain criteria such as cost, distance and time.

The "route display" page 900 includes routing information to direct the route selection of customer 122 to the merchant entity 104.

Based on the customer's choice of route, the merchant computing system 120 is able to determine the distance (miles or km or other unit of distance) between the chosen origin location and the chosen destination location.

Equipment Selection (Step 5000)

Figure 10:
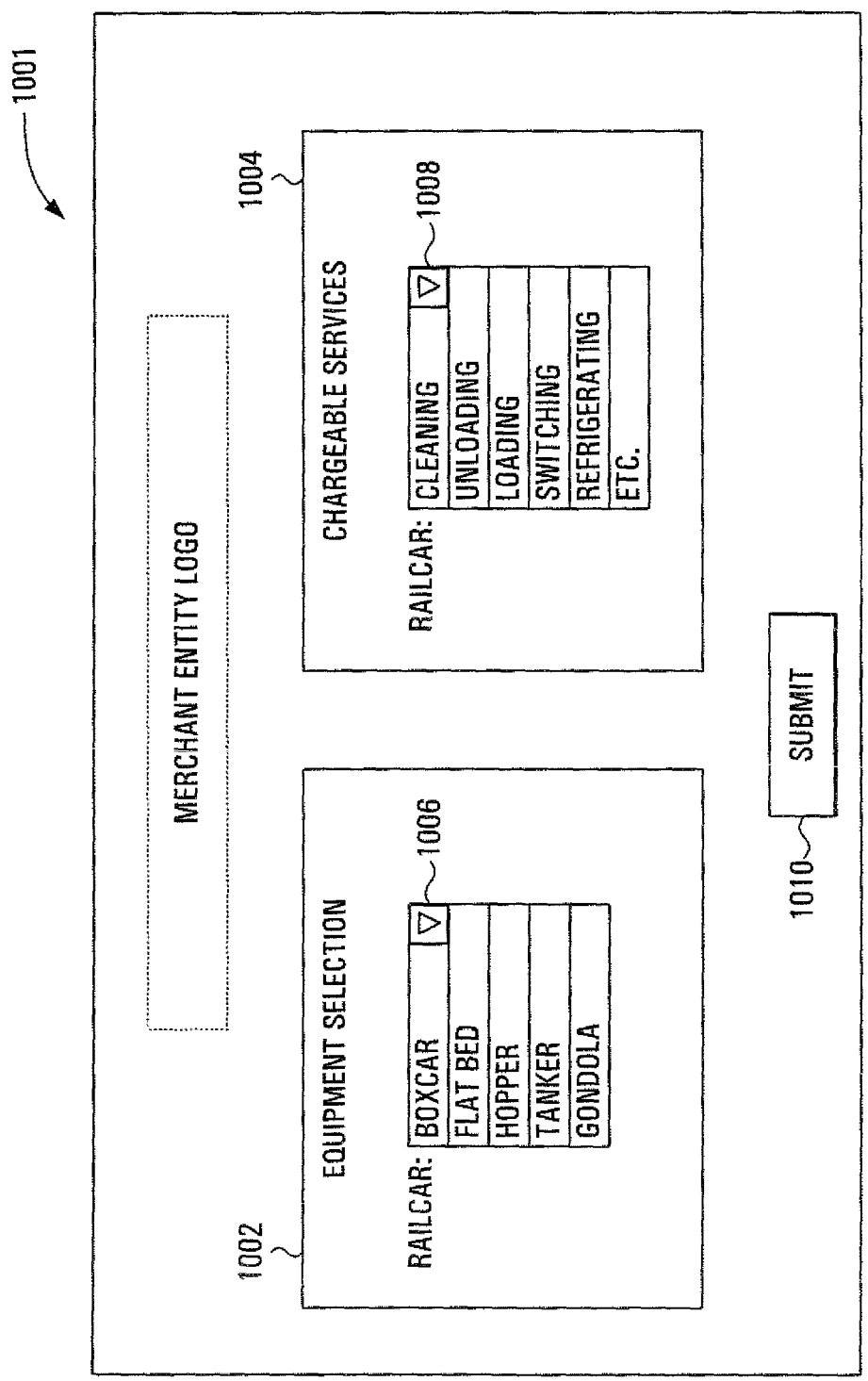
FIG. 10 shows a user interface depicting an "equipment selection" page 1001 of the electronic railway price quotation/ordering system in accordance with a specific example of implementation of the present invention.

In a specific example of implementation, after the customer has selected a route from the list of routes provided by the merchant entity 104, an "equipment selection" page 1001 is automatically launched at customer computing unit 112. "Equipment selection" page 1001 is implemented by program element 218 of merchant computing system 120 and is transmitted to the customer computing unit 112 over network 106. A non-limiting example of the "equipment selection" page 1001 is shown in FIG. 10. The "Equipment selection" page 1001 in accordance with this non-limiting example of implementation is in the form of a graphical user interface displayed on the screen of the customer computing unit 112. As can be seen, the "equipment selection" page 1001 includes customer-modifiable data fields 1002 relating to the equipment selection and, optionally, customer-modifiable data fields 1004 relating to chargeable services. The customer-modifiable data fields 1002 enable the user to select the type of railcar to transport the desired commodity from the origin location to the destination location. The customer-modifiable data fields 1004 enable the user to select the desired services. It will be apparent that certain chargeable services will be automatically selected by the merchant system on the basis of the commodities being transported and on the basis of the type of equipment being used.

The customer modifiable data fields 1002 and 1004 may be comprised of text boxes that allow the customer to type in the desired choices or, alternatively, and as shown in FIG. 10, the customer-modifiable data fields are dropdown selection boxes 1006 that include choices of equipment and chargeable services available to the user. Other suitable formats of customer modifiable data fields are also within the scope of the present invention. The choice of railcar to be used includes, but is not limited to, a gondola car, a tanker car, a flatbed car, a boxcar, a central beam car for logs, a grain car, a railcar for hazardous materials a refrigerated a hopper car and a covered hopper car amongst others.

The customer is enabled to enter information at the customer computing unit 112 about the ownership of at least one rail car that will be used for transporting the shipment of goods. Specifically, the customer is enabled to select the desired ownership of the railcars for the transportation service.

In a first non-limiting example of implementation, customer-modifiable data fields 1002 identify a list of railcars associated to respective owners. The user selects the railcar type jointly with the railcar owner by editing the customer-modifiable data fields 1002. In a second non-limiting example of implementation, for each selected railcar type, the user is permitted to select a railcar owner from a list of railcar owners having the selected railcar type. This may be effected by providing an additional customer-modifiable data field (not shown in FIG. 10) to enable the user to select a railcar owner from a list of railcar owners. Optionally, entries in the list of equipment owners may be enabled/disabled on the basis of the railcar already selected by the user in field 1002. For instance, if a flatbed railcar is selected and only carrier 1 and carrier 3 own flatbed railcars, then only carrier 1 and carrier 3 will be enabled such that the customer may only select carrier 1 or carrier 3.

Advantageously, by allowing the customer to select the owner of the equipment, the customer can have the option to select equipment owned by the merchant entity 104, by a railway carrier other than the merchant entity, or by the customer himself. The selection of equipment owner may result in reduced costs in the transportation service.

As a non-limiting feature of the electronic railway price quotation/ordering system 100, the merchant computing system 120 includes, as part of program element 218, a product configurator program element to customize the "equipment selection" page based on the selections previously made by the customer. For example, the product configurator program element is able to form a basic pool of railcars and is further able to implement a filter for filtering the basic pool of railcars based on one or more filtering criteria to produce a filtered pool of railcars. The filtering criteria can be such things as type of railcar, type of commodity or goods, route chosen, ownership of the railcars etc. . . . In addition, the filtering criteria can be extracted from the customer database 222, or any of the other databases disclosed above. The program element 218 is able to deliver the filtered pool of railcars to the customer's computing unit 112, and the customer is able to select at the computer unit 112 one or more railcars from the filtered pool of railcars. As will be described further on in the specification, the price quote for the transportation service selected by the customer will be based at least in part on one or more characteristics of the railcars selected by the customer.

In a specific implementation, the product configurator program element provides a set of filter modules including an equipment type filter module, a route filter module and an equipment ownership filter module amongst others.

The equipment type filter module processes a list of available equipment types on the basis of the commodity selected by the customer on the "railway transportation ordering" page 700 (shown in FIG. 7) in order to release a list of equipment types suitable for transporting the selected commodities. The suitable equipment types are presented for selection in customer modifiable field 1002. For example, if a customer has indicated on the "railway transportation ordering" page that the commodity to be transported is a petroleum based product, the equipment type filter module conditions the "equipment selection" page such that the customer-modifiable data fields only provide the user with the ability to select equipment (railcars) that can transport a petroleum based product. As such, the choice of a flat bed railcar, or a hopper will not be made available to the customer.

The route filter module of the product configurator processes a list of available equipment types on the basis of the route selected by the user on the "route display" page 900 (shown in FIG. 9) in order to release a list of equipment types suitable to be transported on all the segments of the selected route. This is particularly advantageous when certain segments of the route are not rated to support certain types of railcars, or support railcars weighing more than a certain amount. The suitable equipment types are presented for selection in customer modifiable field 1002.

The equipment ownership filter module of the product configurator processes a list of available equipment types on the basis of the owner of the equipment. In a first non-limiting example, the list of equipment is conditioned on the basis of the owners of the segments of the route selected by the user on the "route display" page 900. For example, if the user selects a route that includes segments owned by two different railway carriers, it is within the scope of the invention for the customer to be able to chose to use either of the first carrier's equipment, or the second carrier's equipment. This is particularly advantageous when the railway carrier provides a discounted rate when a customer uses a rail segment and equipment owned by that railway carrier.

In a second non-limiting example, the list of equipment is conditioned on the basis of the customer profile associated with the customer. For example, the equipment ownership filter module is operative to process the equipment database 223 to identify equipment associated to the customer presently using the railway price quotation/ordering system 100. Where suitable equipment owned by the customer has been identified by searching the equipment database 226, or the customer database 222, to extract information regarding equipment owned by the customer, the equipment ownership filter module releases a list of equipment owned by that customer causing the equipment presented in the dropdown selection box 1006 to include the equipment owned by the customer. The dropdown box 1006 may optionally include equipment owned by others. In such a case, an ordered list of equipment may be presented with the equipment owned by the customer preceding equipment owned by other customers. This is particularly advantageous when the customer owns equipment and is able to obtain a discounted rate for the railway transportation service when using his/her own equipment.

In a third non-limiting example, the list of equipment is conditioned on the basis of the equipment owned by the merchant entity 104. For example, the equipment ownership filter module is operative to process the equipment database 226 to identify equipment associated the merchant entity 104. Where suitable equipment owned by the merchant entity 104 has been identified, the equipment ownership filter module releases a list of equipment owned by the merchant entity 104 causing the equipment presented in the dropdown selection box 1006 to include the equipment owned by the merchant entity 104. The dropdown box 1006 may optionally include equipment owned by others. In such a case, an ordered list of equipment may be presented with the equipment owned by the merchant entity preceding equipment owned by other railway carriers. This is particularly advantageous when the merchant entity owns equipment and it is desired that the merchant entity's equipment be favored over that of other railway carriers when using railway price quotation/ordering system 100.

The above described filter modules are used in combination to provide the user with a list of suitable equipment types for the transportation service. For example, the equipment type filter module is first applied to the list of all possible railcars to eliminate railcars that are unsuitable to carry the commodity selected by the user which results in a first subset of equipment. The first subset of equipment is then processed by the equipment ownership filter module to order the first subset of equipment such that equipment owned by the merchant entity is displayed to the user preceding equipment owned by other railway carriers.

As described above, the "equipment selection" page 1001 optionally includes data fields that enable the user to select customized chargeable services 1004 in addition to the standard default chargeable services associated with any given railway transportation service. As a non-limiting example of implementation, and as shown in FIG. 10, the customer modifiable data field is a drop down box 1008 listing chargeable services available to the customer 122. Chargeable services include such items as handling goods, mounting and dismounting of containers, loading, unloading, customs inspection, demurrage and the like. A list of chargeable services is described in U.S. Pat. No. 6,061,667, issued on May 9, 2000 to Danford-Klein et al., the contents of which are incorporated herein by reference. If the "equipment selection" page 1001 does not include data fields enabling the customer to select chargeable services, or if the customer does not wish to select any additional chargeable services, the merchant computing unit 120 will generate a price quote based on the use of default chargeable services. The default chargeable services are based at least in part on the commodity being transported and on the type of railcar used for the transportation service. For example, if the commodity being transported is petroleum and a tanker car is used, then chargeable services associated to the cleaning of the tanker car will be applicable to the transportation service.

Once the customer has indicated the desired equipment and chargeable services in the customer modifiable data fields, the information is submitted to the merchant entity 104. The "equipment selection" page 1001 facilitates the communication between customer 122 and merchant entity 104. The "equipment selection" page includes the necessary routing information to direct the information over the network 106 to the merchant computing system 120. The customer submits the information entered into the "equipment selection" page to the merchant entity 104 over network 106 through an input device such as a pointing device, keyboard, touch sensitive surface, speech recognition unit or other suitable input device. In the specific example shown in FIG. 10, the customer selects the "submit" button 1010 located at the base of the "equipment selection" page in order to submit the entered information to the merchant entity 104.

Computation of Price Quote (Step 6000)

The information obtained from the user through the "railway transportation ordering" page 700, the "route display" page 900 and the "equipment selection" page 1001 is received and processed by the merchant computing system 120 to generate a price quote for the transportation service selected by the customer.

In a non-limiting implementation, with reference to FIG. 2b, program element 218 of the merchant computing system 120 includes a pricing engine module operative to calculate a price quote for the transportation service selected by the customer. The pricing engine module uses data elements included within the customer database 222, the routing database 224, the equipment database 226, the commodity database 228 and a series of pricing equations (see equations 1-6 below) in order to calculate a price quote for the services selected by the customer.

The processor 212 of the merchant computing system 120 accesses the databases described above in order to access data elements to be used in the pricing equations.

It is within the scope of the invention for the pricing engine module to compute a price for the transportation of goods based on a route having at a first segment, and a second segment, wherein the goods are transported on the first segment by a mode of transportation other than a train, and the goods are transported on the second segment by a train. The pricing engine module computes the price of the goods on the route based at least in part on the basis of characteristics of the first segment entered by the customer and characteristics of the second segment entered by the user. Characteristics of the first segment and second segment of the routes can be entered by the user in the "railway transportation ordering" page, the "route display" page, and the "equipment selection" page. For example, based at least in part on the information entered by the customer about the origin of the first segment, and information identifying the location of the train station, the merchant entity 104 can determine that transportation by trucking will be required. Trucking charges for the first segment can be based on the information about origin and destination entered by the customer. Based on this information, the puce engine module can assess the distance between the two locations and can compute the trucking charges based on the assessed distance.

Figure 11:
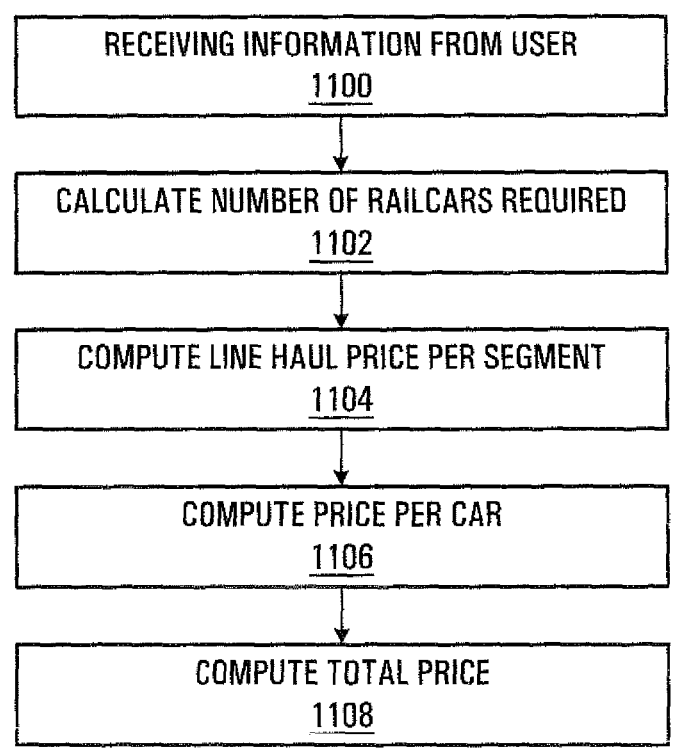
FIG. 11 is a flow diagram depicting a process for generating a price quote for a rail transportation service in accordance with a specific example of implementation of the present invention.

The computation of the price will be described with reference to FIG. 11 of the drawings. At step 1100, the pricing engine module receives the information obtained from the user including commodity type, commodity weight, railcar type and selected route. At step 1102, the pricing engine processes the commodity type, commodity weight and railcar type to derive the number railcars required for transporting the commodity. To calculate the number of railcars required to transport the commodity specified by the customer, the pricing engine makes use of total weight of the commodity and the commodity type specified by the user through the "railway transportation ordering" page 700 as well as the weight carrying capacity of the railcar selected by the user. In order to obtain the weight carrying capacity of the railcar selected by the user, the pricing engine accesses the equipment database 226 to locate the entry that corresponds to the railcar selected by the user. The pricing engine then computes the number of railcars required. Mathematically, the number of railcars required may be expressed as follows:

$$\text{\# railcars required} = \frac{\text{total weight of commodity}}{\text{capacity of selected railcar}} \qquad \text{Equation 1}$$

The number of railcars required is rounded up to the nearest whole number.

Once the pricing engine has calculated the number of railcars required, the line haul price for each segment of the route is calculated at step 1104.

The price of the railway service is based at least in part on the type of commodity or goods being transported. As such, the pricing engine searches commodity database 228 for an entry corresponding to the STCC of the commodity specified by the customer. Once the corresponding entry is found, the associated cost per distance data element (STCC $/mile) is extracted. Following this, the pricing engine searches equipment database 226 to locate the railcar selected by the user and extracts an associated ownership factor associated to the selected railcar. As such, the cost of the shipment of goods is based at least in part on the ownership of the railcars selected by the customer. As shown in table 3, the ownership factor is a function of the railcar and of the customer making the request. Table 3 is reproduced below for the user's convenience.

TABLE 3

Equipment database

| Equipment | Carrying Capacity | Ownership | Ownership Factor | Chargeable services | Cost per mile |
|---|---|---|---|---|---|
| Flatbed | 2 tons | Merchant Entity | 1 for all | Cleaning Unloading | 15.95 |
| Flatbed | 1.5 tons | Customer 2 | .5 for "Customer 2" 1 for everyone else | Cleaning Unloading | 15.95 |
| Flatbed | 2 tons | Railway Carrier 2 | 0.8 for "Customer 1" 1.5 for everyone else | Cleaning Unloading | 15.95 |
| Tanker | 5 tons | Merchant Entity | 1 | Cleaning Unloading | 20.00 |
| Tanker | 3 tons | Customer 1 | .5 for "Customer 1" 1 for everyone else | Cleaning Unloading | 20.00 |
| Boxcar | 2 tons | Merchant Entity | 1 | Cleaning Unloading | 5.95 |
| Boxcar | 3.5 tons | Customer 3 | .75 for "Customer 3" 1 for everyone else | Cleaning Unloading | 5.95 |
| Hopper | 6 tons | Merchant Entity | 1 | Cleaning Unloading | 17.99 |

Once the corresponding equipment factor has been identified, for each segment of the route, the pricing engine searches the routing database 224 to identify the owner of the segment and the distance associated to the segment. The pricing engine then computes the base line-haul price for each segment. The calculation of the base line haul price for a given segment can be expressed mathematically as follows:

$$\text{Base Line haul } price_{segment} = (stcc_{\$/distance} * distance_{segment}) + \\ (stcc_{\$/weight} * weight * \text{equipment ownership factor})$$

Equation 2 where $stcc_{\$/distance}$ is the cost per distance data element associated to the commodity being transported, $distance_{segment}$ is the length of the current segment, $stcc_{\$/weight}$ is the cost per unit weight associated to the commodity being transported, weight is the weight of the commodity being transported in the current railcar and "equipment ownership factor" is the ownership factor associated to the railcar used to transport the commodity. The above computation allows providing a price for the transportation of a commodity that is conditioned on the ownership of the equipment used to transport the commodity. In addition the above computation allows providing a price for the transportation of a commodity that is conditioned on the route selected by the user. In light of the above, it will be readily apparent to the person skilled in the art that other suitable equations for computing a Base Line-haul price for a segment may also be used without detracting from the spirit of the invention.

Although the equipment ownership factor has been shown to be a separate factor in equation 2, it is within the scope of the invention for the ownership factor to be incorporated within either one, or both, of the $stcc_{\$/distance}$ and $stcc_{\$/weight}$ factors. It should also be appreciated that the factors used in the equations, such as $stcc_{\$/distance}$ and $stcc_{\$/weight}$ do not have to be fixed values and can instead be functions of such variables as distance and weight. In a non-limiting example of implementation, the $stcc_{\$/distance}$ factor used in equation 2 can be a certain value for a predetermined distance such as 500 km, and can then drop by an incremental amount for each additional 100 km traveled. It is within the scope of the invention for all the factors used in the equations described herein to be a function of other factors. Such variations in the factors used in the equations disclosed herein will be apparent to those skilled in the art.

Alternatively, the base line haul price may be a flat rate for transportation of a railcar over the segment.

Optionally, where an ownership factor is associated to the segment, the Line Haul Price$_{segment}$ is conditioned in the basis of the segment ownership factor identified in the routing database 224. Mathematically, this may be expressed as follows:

$$\text{Line Haul Price}_{segment} = \text{Base line-haul price}_{Segment} \times \\ \text{segment ownership}_{factor}$$

Equation 3

The above computation allows providing a price for the transportation of a commodity that is conditioned on the ownership of the segment of the route used to transport the commodity. In light of the above, it will be readily apparent to the person skilled in the art that other suitable equations for computing a Base Line-haul price for a segment may also be used without detracting from the spirit of the invention.

On the basis of the above, a line-haul price for each segment is calculated.

Following this, at step 1106, the pricing engine calculates the price of transporting one railcar carrying the desired commodities from the origin location to the destination location specified by the customer. In a non-limiting example, the price per railcar is expressed as the sum of the line haul rate and chargeable services charged. The calculation of the price of transporting one railcar from the origin location to the destination location specified by the user can be expressed mathematically as follows:

$$\text{Prices}_{\$/railcar} = \Sigma[(\text{line haul price}_{merchant\ segment}) * \\ BU_{coeff\ origin\ SPLC} * BU_{coeff\ destination\ SPLC}] + \Sigma[\text{line haul price}_{NON\ merchant\ segment}] + \Sigma[\text{chargeable services}]$$

Equation 4

Where $\Sigma[\text{chargeable services}]$ is the sum of the prices for chargeable services (default and user selected), the $BU_{OriginSPLC}$ and the $BU_{DesitinationSPLC}$ represent a charge levied for the origin and destination SPLC's. In a non-limiting implementation, the chargeable service price may be obtained by a rate lookup in a table of prices for chargeable services. The table of prices is stored in the data segment 220 of memory unit 216 (shown in FIG. 2b). The rate of a chargeable service may be a function of a number of parameters including the type of chargeable service, the commodity being transported, the location of the chargeable service to be rendered, the customer profile and the equipment (railcar) being used. Mathematically, this may be expressed as follows:

$$\text{Chargeable service rate} = \text{Rate Price}[\text{Service,Commodity,Location}_{splc},\text{Customer}_{ccid},\text{Equipment}]$$

Equation 5

Once the price per railcar has been calculated (equation 4) and the number of railcars required to transport the quantity of commodity has been calculated (equation 1), at step 1108 the price quote for the transportation service selected by the customer can be obtained by multiplying the price per car by the number of cars. Mathematically, this can be expressed as follows:

$$\text{price quote} = \text{Price}_{\$/railcar} * \text{number of railcars required}$$

Equation 6

The pricing engine then releases the computed price quote.

Marketing Options and Adjustment of Price Quote (Step 7000)

Once an initial price quote has been calculated by the pricing engine, the initial price quote can either be submitted to the customer over the network 106, or alternatively can be processed by a marketing engine implemented by program element 218. The marketing engine allows modifying the price generated by the pricing engine on the basis of various criteria including, but not limited to, the customer's profile and a particular marketing campaign.

In a first non-limiting example, the initial price quote is adjusted by the marketing engine on the basis of the customer profile associated to the customer. As previously described, registered customers of the merchant entity are associated to customer profiles which include data elements indicative of discount rates to which the associated customer is eligible. The marketing engine is operative to interact with customer database 222 to identify an entry in the customer database 222 associated to the customer using the price quotation/ordering system 100, in order to extract a discount data element associated to the customer. For example, if the customer is a registered customer, the marketing engine accesses the customer database 222 and determines if the customer is eligible for a discount. If the customer who submitted the transportation service quote request is associated to a certain discount rate based on, for example, the fact that the merchant entity has decided that that specific customer is a valued customer, then the initial price quote determined by the pricing engine is adjusted based on the discount rate associated to that customer. Mathematically this may be expressed as follows:

$$\text{price quote} = \text{initial price quote} * (1 - \text{discount rate})$$

Equation 7

It is to be appreciated that the discount may be expressed in terms of absolute dollar amount or absolute dollar amount per car. Mathematically this may be expressed as follows:

$$\text{price quote} = \text{initial price quote} - \text{discount} \qquad \text{Equation 8}$$

It is within the scope of the invention for different discount rates to be associated to different customers. For example, the profile of customer 1 within the customer database 222, may indicate that customer 1 is eligible for a 10% discount rate on all quotes, while the profile of customer 2 may indicate that customer 2 is eligible for a 20% discount rate on all quotes. Alternatively, different discount rates may be assigned to a same customer dependent upon the commodities being transported, the type of railcar being used, the date of the transportation service, the origin or transportation, the destination of transportation, the distance of transportation or any other suitable criteria such as time data. The time data can include a time of day, a week, a month or a time of year such as a season. As such, the discount data element is associated to a plurality of discount eligibility criteria, such as specific customer, and service requested by the customer. For example, the profile of customer 1 may indicate that customer 1 is eligible for a 10% discount on all quotes relating to the transportation of wheat and no discount for the transportation of any other commodity. In another example, the profile of customer 1 may indicate that customer 1 is eligible for a 10% discount on all quotes where a flatbed car is used and 15% where a refrigerated railcar is used and no discount for any other equipment type.

In a second non-limiting implementation, the initial price quote is adjusted by the marketing engine on the basis of a particular marketing campaign for which the railway transportation service selected by the customer qualifies. In this specific implementation, the data segment 220 of memory unit 216 (shown in FIG. 2B) further includes a database of promotional events (shown below) including a plurality of entries, each entry in the database of promotional events being associated to a certain promotional event. Entries in the database of promotional events can include such things as origin locations, destination locations, distances, types of equipment, type of commodity and time data. The time data can include a time of clay, a week, a month or a time of year such as a season. A season can be a calendar season such as spring, summer, fall and winter, or alternatively a season can be any period of the calendar year defined by the merchant entity. For example, the merchant entity may define the period between November and February as a "high traffic" season. The entries in the database of promotional events are modifiable by account manager at the merchant entity 104 such as to allow the promotional events to be easily modified. Each entry includes a plurality of fields including the criteria required for a customer to be eligible for the promotional events as well as the applicable discount. A non-limiting example of implementation of a database of promotional events is shown below:

TABLE 5

Database of Promotional Events

| Criteria | Applicable Discount |
| --- | --- |
| 1. Use of refrigerated cars<br>2. In January | 10% |
| 1. Origin of the transportation in California<br>1. Use of flatbed cars | 100$/car |
| 2. Destination of the transportation in California | 5% |
| 1. Use of flatbed cars in February | 200$/car |

TABLE 5-continued

Database of Promotional Events

| Criteria | Applicable Discount |
| --- | --- |
| 1. Transportation of petroleum products<br>2. February<br>3. Distance over 500 km | 25% |

The database of promotional events maps information identifying discount eligibility criterion to a discount data element. A marketing engine is operative to interact with the database of promotional events to identify one or more promotions for which the customer, or the transportation service selected by the customer qualifies. The marketing engine is further operative to identify at least one entry in the database of promotional events associated to a certain discount eligibility criterion and to a certain discount data element. In a non-limiting example, if the customer qualifies for a discounted price under one marketing promotion, the initial price quote is adjusted according to the discount rate or discount amount described in the marketing promotion. As can be seen, the database of promotional events includes entries indicative of at least two discount eligibility criteria. For example, in order to be eligible for a discount or 10%, the discount eligibility criteria of "use of refrigerated cars", as well as "transportation within the month of January" must be satisfied. In addition, if the customer qualifies for a discounted price under two or more marketing promotions, the initial price quote is adjusted according to the discount rate or discount amount that is the most advantageous to the customer. In an alternative implementation, if the customer qualifies for a discounted price under two or more marketing promotions, the initial price quote is adjusted according to all the applicable marketing promotions.

For example, the database of promotional events indicates that the merchant entity 104 is offering a discount wherein during the month of February a 25% discount is applied to the transportation of petroleum products that are being transported over 500 km. If the railway transportation service requested by the customer satisfies these criteria, the railway transportation service is eligible for this discount and the initial price quote generated by the pricing engine will be adjusted accordingly.

As can be seen from equations 7 and 8, the price quote is computed at least in part on the basis of a discount data element derived from either a marketing campaign, a customer profile, or a combination of the two.

Once the initial price quote has been adjusted based on customer profile, or on the basis of a particular marketing campaign, if eligible for either, the price quote (i.e. the price for the shipment of goods) is transmitted over the computer network 106 to be displayed on the screen of the customer computing unit 112. The price may be transmitted to the customer computing unit 112 for display via the graphical user interface which is implemented by program element 218 from the merchant computing system 120 and automatically launches to aid customer 122. Alternatively, the price may be transmitted to the customer computing unit 112 via e-mail, snail-mail or any other suitable manner implemented by program element 218.

Although it has been disclosed above (equations 7 and 8) that an initial price quote is modified on the basis of a discount data element to determine a discounted price for a shipment of goods, it should be expressly understood that the discount rate may be incorporated into any of the above equations such that the initial price quote calculated is indicative of a discounted rate without having to be modified. For example, it is within the scope of the invention for the merchant entity 104, upon establishing that the customer is eligible for a discounted rate, to modify each factor within the above described equations such that the initial price computed is indicative of a discounted rate and it is not necessary to adjust the initial price quote.

Display Price Quote (Step 8000) and Accept, Reject or Save Price Quote (Step 9000)

The price quote is received at the customer computing unit 112 and is displayed on a "price display" page that is preferably in the form of a graphical user interface, and the customer either accepts or rejects the quote. Each quote is typically associated to a certain validity period after which the quote is no longer active. A typical validity period has a duration of 2 weeks, however, shorter or lengthier validity periods may be used without detracting from the spirit of the invention.

In a non-limiting example of implementation, when applicable, both the initial price quote and the discounted price quote are displayed to the user in order to allow the latter to view the savings.

In another non-limiting example of implementation, when applicable, the price quote is displayed along side advertising for upcoming promotions offered by the merchant entity 104.

The "price display" page allows the user to either accept, reject or save the price quote provided by the merchant entity 104. In a non-limiting implementation, the "price display" page includes a set of button elements associated to "accept", "reject" or "save" functions which may be selected by the user through a pointing device, touch sensitive screen, keyboard, voice recognition unit or other suitable input device.

If the quote is rejected, the customer's railway transportation order is deleted from the merchant computing system 120. The customer may submit through the network a reason for the rejection. This may be done through email, or through writing a message in a pop-up text box that appears when the customer rejects the quote. The "price display" page includes the necessary routing information to direct the message back to the merchant entity 104. The customer may also choose to provide the merchant entity 104 with the reasons for the rejection through alternate means such as by telephone or fax.

If the quote is accepted then the order for the railway transportation service relating to that price quote is submitted to the merchant entity 104 and is stored in the memory 206 of the merchant computing system 120. In addition, the information related to the price quote is added to a list of quotes that have been previously accepted by that specific customer in the customer profile at the merchant computing system 120. The "price display" page includes the necessary routing information to direct the accepted price quote to the merchant entity 104.

Finally, the customer may choose to save the quote and delay responding to the quote until a later time. In this case, the merchant computing system 120 stores in its memory 206, in connection with the specific customer, the information related to the price quote and the railway transportation service to which the price quote corresponds. The time delay after which the price quote is no longer valid is also stored. The "price display" page includes the necessary routing information to direct the save message back to the merchant entity 104. Active quotes associated to given customers are stored on a computer readable storage medium at the customer-computing unit 112 or at the merchant computing system 120 and can be retrieved by the customer through the computer network 106. A graphical user interface is also provided to allow a customer to view the active quotes.

Although the detailed description describes extensively a system for requesting a price quote for shipping goods by rail via a web based interface, other embodiments are possible. For example, user interfaces for gathering information relating to railway transportation services desired by a customer may be sent to the customer via electronic mail. Likewise, a list of potential routes between a chosen origin and destination location, and a price quote may also be submitted via electronic mail.

Although the above described specific examples of implementation describe a railway price quotation/ordering system 100 where the computations of the price quote are effected at the merchant computing system 120, embodiments of the invention where the price quote is computed at the customer computing unit 112 remain within the scope of the invention. In such an embodiment, a program element implementing the pricing engine, including any required database information is sent from the merchant computing system to the customer computing unit and launched at the customer computing unit 112. It will also be apparent that a program element "route determination algorithm" as well as the routing database may also be implemented at the customer computing unit 112, or downloaded at customer computing unit 112 from the merchant computing system 120. In such a variant, upon receiving the origin location and destination location, the program element implementing the route determination algorithm derives a list of possible routes between the origin location and destination location without requiring interaction with the merchant computing system 120.

In addition, although the above described specific examples of implementation describe the railway price quotation/ordering system 100 in a client-server arrangement, an application suitable for operating on a general purpose standalone digital computer also remains within the scope of the invention. In such an embodiment, the program element 210 and the data 220 described in connection with the merchant computer system 120 are implemented on a standalone computer.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for a rail transportation company to obtain particulars from a customer about a shipment of goods and to perform the shipment of goods, said method comprising:

a. performing a freight railcar type and a freight railcar ownership selection operation, the freight railcar type and the freight railcar ownership selection operation including an exchange of data between a server arrangement and a remote customer computer system over a data network, the exchange of data involving an equipment database storing information about freight railcars, the information distinguishing between a set of freight railcars owned by the customer and freight railcars owned by one or more entities other than the customer, the freight railcar type and the freight railcar ownership selection operation allowing the customer at the customer computer system to direct the rail transportation company via a Graphical User Interface (GUI) to use for the shipment a freight railcar of a type selected by the customer and owned by an entity selected by the customer, the freight railcar type and ownership selection operation including configuring the GUI on the customer computer system by dynamically modifying an input object of the GUI providing equipment options the customer can select, the configuring of the GUI including:
  i. displaying on the GUI, at least two freight railcar type options that the customer can choose from, the at least two freight railcar type options including a first option which identifies a first type of freight railcar to be used for the shipment, and a second option which identifies a second type of freight railcar to be used for the shipment which is different from the first type of freight railcar;
  ii. searching the set of freight railcars owned by the customer in the equipment database for a freight railcar of the type selected by the customer;
  iii. when the search determines that the set of freight railcars owned by the customer includes a freight railcar of the type selected by the customer, configuring the GUI to present the customer with at least two freight railcar ownership options that the customer can choose from, one of the freight railcar ownership options identifying the customer as owner of the freight railcar to be used for the shipment, another of the freight railcar ownership options identifying an entity other than the customer as owner of the freight railcar to be used for the shipment;
  iv. when the search determines that the set of freight railcars owned by the customer does not include a freight railcar of the type selected by the customer, configuring the GUI to present the customer with one or more freight railcar ownership options identifying one or more entities other than the customer as owner of the freight railcar to be used for the shipment;
 b. performing the shipment by using a freight railcar of the type selected by the customer among the freight railcar type options and owned by the entity selected by the customer among the one or more freight railcar ownership options.

2. A method as defined in claim 1, wherein the configuring of the GUI including omitting from the freight railcar ownership options selectable by the customer a selectable freight railcar ownership options identifying the customer as owner of the freight railcar to be used for the shipment.

3. A method as defined in claim 2, wherein the first freight railcar type option is in the group of freight railcar types consisting of boxcar, flatbed car, hopper car, tanker car and gondola car.

4. A method as defined in claim 3, wherein the second freight railcar type option is in the group of freight railcar types consisting of boxcar, flatbed car, hopper car, tanker car and gondola car.

5. A method as defined in claim 2, wherein when the set of freight railcars owned by the customer includes a freight railcar of the type selected by the user among the freight railcar type options, the another of the freight railcar ownership options identifying the rail transportation company as owner of the freight railcar to be used for the desired shipment.

6. A method as defined in claim 2, wherein the rail transportation company is a first rail transportation company, wherein when the set of freight railcars owned by the customer includes a freight railcar of the type selected by the user among the freight railcar type options, the another of the freight railcar ownership options identifying a second rail transportation company different from the first rail transportation company as owner of the freight railcar to be used for the desired shipment.

7. A method as defined in claim 2, wherein the exchange of data further implementing a route selection operation between an origin of the shipment and a destination of the shipment, the route selection operation including presenting the user via the graphical user interface with at least two route options between the origin of the desired shipment and the destination of the desired shipment, the performing of the desired shipment of good including performing the shipment according to the route option selected by the user.

8. A method as defined in claim 2, wherein the exchange of data further implementing a freight railcar service selection operation allowing the user at the customer client system to direct the rail transportation company via the graphical user interface to perform one or more services on the freight railcar to be used for the desired shipment, the freight railcar service selection operation presenting the user via the graphical user interface with a plurality of service options that the user can chose from, the method further including performing the one or more services chosen by the user via the graphical user interface on the freight railcar.

9. A method as defined in claim 8, wherein the plurality of service options include at least one service option selected in the group consisting of cleaning the freight railcar, loading the freight railcar, unloading the freight railcar, refrigerating the freight railcar and switching the freight railcar.

10. A method as defined in claim 2, including computing a price for the desired shipment at least in part on the basis of the entity that owns the freight railcars selected by the user.

11. A method as defined in claim 10, including using as a factor the freight railcar type selected by the user during the computing.

12. A method as defined in claim 2, wherein the equipment database is part of the server arrangement.

* * * * *